US 011191216B2

(12) United States Patent
McHale et al.

(10) Patent No.: US 11,191,216 B2
(45) Date of Patent: Dec. 7, 2021

(54) CONVEYING DEVICE AND A METHOD FOR CONVEYING MATERIAL, THROUGH A CONVEYING CHANNEL

(71) Applicant: McHale Engineering, Ballinrobe (IE)

(72) Inventors: Padraic Christopher McHale, Clonbur (IE); Martin William McHale, Kilmaine (IE); Paul Gerard McHale, Galway (IE); James John Heaney, Claremorris (IE); Gerard Patrick Sheridan, Kilmaine (IE); Donal Patrick Collins, Dunmore (IE); John Alexander Warren, Hollymount (IE); John Patrick Biggins, County Mayo (IE)

(73) Assignee: McHale Engineering, Ballinrobe (IE)

( * ) Notice: Subject to any disclaimer, the term of this patent is extended or adjusted under 35 U.S.C. 154(b) by 212 days.

(21) Appl. No.: 16/469,741

(22) PCT Filed: Dec. 14, 2017

(86) PCT No.: PCT/EP2017/082943
§ 371 (c)(1),
(2) Date: Jun. 14, 2019

(87) PCT Pub. No.: WO2018/109140
PCT Pub. Date: Jun. 21, 2018

(65) Prior Publication Data
US 2020/0008360 A1    Jan. 9, 2020

(30) Foreign Application Priority Data

Dec. 14, 2016    (IE) .................................... 2016/0277

(51) Int. Cl.
*A01F 15/10*    (2006.01)
*A01D 78/04*    (2006.01)
(Continued)

(52) U.S. Cl.
CPC ............ *A01F 15/106* (2013.01); *A01D 78/04* (2013.01); *A01F 17/02* (2013.01); *B65G 19/04* (2013.01);
(Continued)

(58) Field of Classification Search
CPC .. A01F 15/106; A01F 17/02; A01F 2015/107; A01F 15/10; A01D 78/04; A01D 87/0007; B65G 19/04; B65G 41/002
See application file for complete search history.

(56) References Cited

U.S. PATENT DOCUMENTS 4,275,550 A    6/1981  Swenson et al.
4,569,282 A *  2/1986  Galant .................... A01F 15/04
                                                    100/189

(Continued)

FOREIGN PATENT DOCUMENTS

EP    1 062 860 A2    12/2000
EP    3 158 859 A1    4/2017

OTHER PUBLICATIONS

International Search Report for PCT/EP2017/082943 dated Apr. 12, 2018 [PCT/ISA/210].
(Continued)

*Primary Examiner* — Arpad Fabian-Kovacs
(74) *Attorney, Agent, or Firm* — Sughrue Mion, PLLC

(57) ABSTRACT

A conveying device for conveying crop material from a pick-up mechanism to a baler comprises a conveying channel having a base comprising an upstream base part and a downstream base part. The downstream end of the upstream base part is supported on a pair of first resilient mounting members and the upstream end of the downstream base part is supported on a pair of second resilient support members. The first and second resilient support members, in response to the force with which crop material is being urged by the
(Continued)

Figure 1:
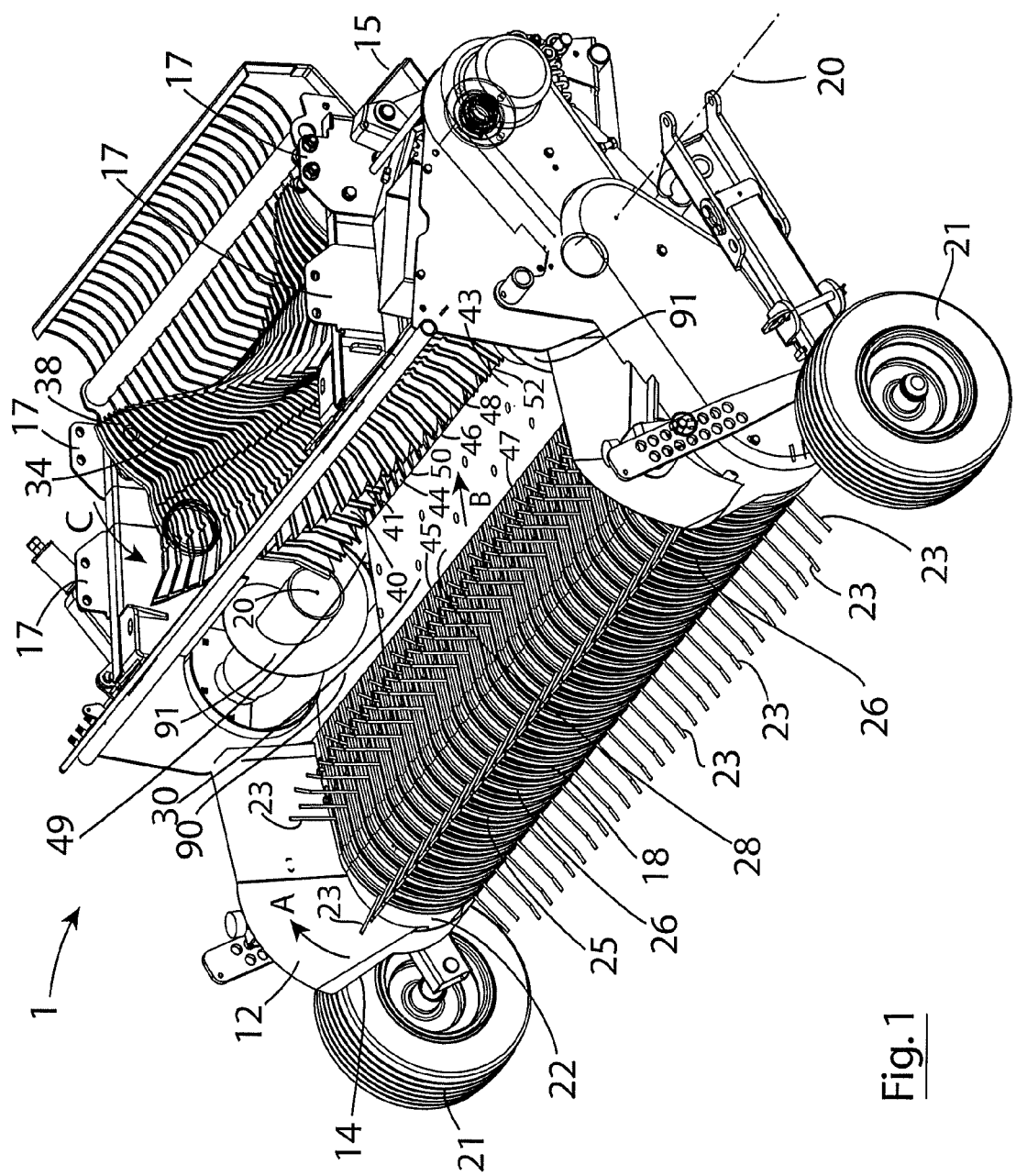

feed rotor against the upstream and downstream base parts exceeding respective first and second predefined values, yield. This results in downward displacement of the upstream base part and the downstream base part to permit crop material to pass through the conveying channel.

20 Claims, 8 Drawing Sheets

(51) Int. Cl.
  *A01F 17/02* (2006.01)
  *B65G 19/04* (2006.01)
  *B65G 41/00* (2006.01)
  *A01D 87/00* (2006.01)

(52) U.S. Cl.
  CPC ........ B65G 41/002 (2013.01); *A01D 87/0007* (2013.01)

(56) References Cited

U.S. PATENT DOCUMENTS

| | | | |
|---|---|---|---|
| 4,862,684 A * | 9/1989 | Naaktgeboren | A01F 15/101 56/341 |
| 4,956,967 A * | 9/1990 | De Busscher | A01F 12/16 100/142 |
| 4,962,632 A * | 10/1990 | Schoonheere | A01F 15/101 100/142 |
| 5,819,517 A * | 10/1998 | Amanatidis | A01D 90/04 56/341 |
| 9,526,214 B2 * | 12/2016 | McClure | A01F 15/106 |
| 9,549,506 B2 * | 1/2017 | McClure | A01F 15/106 |
| 9,713,306 B2 * | 7/2017 | Singh | A01F 15/07 |
| 9,839,181 B2 * | 12/2017 | Singh | A01F 15/18 |
| 9,907,232 B2 * | 3/2018 | Rosseel | A01F 15/10 |
| 10,021,835 B2 * | 7/2018 | Ravaglia | A01F 15/106 |
| 10,462,974 B2 * | 11/2019 | Schinstock | A01D 90/04 |
| 10,485,182 B2 * | 11/2019 | Devroe | A01F 15/101 |
| 10,588,272 B2 * | 3/2020 | Devroe | A01F 17/02 |
| 2008/0028737 A1 * | 2/2008 | Viaud | A01F 15/106 56/341 |
| 2008/0028738 A1 * | 2/2008 | Viaud | A01F 15/106 56/341 |
| 2014/0021018 A1 * | 1/2014 | Biziorek | A01F 15/10 198/722 |
| 2014/0318391 A1 * | 10/2014 | Verhaeghe | A01F 15/04 100/35 |

OTHER PUBLICATIONS

Written Opinion for PCT/EP2017/082943 dated Apr. 12, 2018 [PCT/ISA/237].

* cited by examiner

CONVEYING DEVICE AND A METHOD FOR CONVEYING MATERIAL, THROUGH A CONVEYING CHANNEL

CROSS REFERENCE TO RELATED APPLICATIONS

This application is a National Stage of International Application No. PCT/EP2017/082943 filed Dec. 14, 2017, claiming priority based on Irish Patent Application No. S2016/0277 filed Dec. 14, 2016.

The present invention relates to a conveying device, and in particular though not limited to a conveying device for conveying crop material to a baler, and the invention also relates to a method for conveying material through a conveying channel. Additionally, the invention relates to a baler comprising the conveying device.

Balers for baling materials, and in particular balers for baling crop material, such as forage crop materials, for example, grass, silage, hay, straw and the like are well known. In general, such balers can be classified into two broad types, those which are commonly referred to as round balers and which produce a cylindrical bale, commonly referred to as a round bale, and those which are commonly referred to as square balers and which produce a parallelepiped bale, commonly referred to as a square bale or a large square bale, depending on the bale size.

Balers for producing round bales typically comprise three types, namely, belt balers, roller or fixed chamber balers, and balers which comprise a combination of belts and rollers. Belt balers in general, comprise one or more belts which define a bale forming chamber within which the crop material is rotated by the movement of the belts and compressed by the action of the belts to form a cylindrical bale. The diameter of the bale forming chamber defined by the belts increases as the bale is being formed. In general, such belt balers can produce bales of selectable diameters. Roller or fixed chamber balers, in general comprise a plurality of circumferentially arranged rotatably mounted bale forming rollers which define a bale forming chamber. The bale forming rollers are rotated for rotating the crop material within the bale forming chamber in order to form the crop material into a cylindrical bale. As the crop material is being progressively fed into the bale forming chamber, the rollers compress the crop material to form the cylindrical bale of the crop material. In general, the bale forming chamber of such balers is of fixed size, and such balers produce round bales of fixed diameter. The third type of baler comprises a combination of rollers and one or more belts, and in general are suitable for producing bales of selectable diameter.

In general, such balers are towed behind a tractor, and a pick-up and feeding system is required to pick up the crop material from the ground and feed the crop material into the bale forming chamber through an inlet opening.

In general, such pick-up and feeding systems comprise a pick-up drum which comprises a plurality of circumferentially spaced apart and longitudinally spaced apart tines extending generally radially from the drum. As the drum rotates the tines pick up the crop material from the ground and transfer the crop material onto a conveying channel of a conveying device.

A feed rotor located in the conveying channel of the conveying device urges the crop material through the conveying channel and through the inlet opening into the bale forming chamber of the baler. The feed rotor in general comprises a rotatably mounted rotor shaft, and a plurality of feed fingers extending substantially radially from the rotor shaft and spaced apart circumferentially around and spaced apart longitudinally along the rotor shaft. Additionally, adjacent feed fingers along the rotor shaft are angularly off-set from each other circumferentially around the rotor shaft. Typically, such conveying channels comprise a base, which typically extends from the pick-up drum to the inlet opening to the bale forming chamber, and the feed rotor is located in the conveying channel just above the base. In general, the crop material is picked up from an elongated continuously extending sward thereof lying in a field in which the crop material has been harvested.

However, such swards of crop material are not always of constant volume per unit length of sward and furthermore are not always of constant density. The density of a sward or the volume per unit length of the sward can vary dramatically along its length. This, in general, causes problems with crop feeding system of such balers. While variations in the density or the volume per unit length of the sward do not unduly affect the pick-up mechanism, variations in the density or the volume per unit length of the sward can result in problems once the sward is delivered from the pick-up mechanism onto the base of the conveying channel of the conveying device.

In general, where the spacing between the base of the conveying channel and the conveying rotor are set to accommodate swards of relatively low density or low volume per unit length, it has been found that swards of relatively high density or high volume per unit length can result in jamming of the crop material between the feed rotor and the base. In cases where the spacing between the base of the conveying channel and the feed rotor is set to accommodate swards of relatively high density or high volume per unit length, because of the spacing between the base and the feed rotor and the relatively low depth, which swards of relatively low density or relatively low volume per unit length take up on the base of the conveying channel, it has been found that the feed rotor is unable to grip the crop material at a distance sufficiently upstream of the rotor, in order to prevent the crop material building up on the base of the conveying channel upstream of the feed rotor, and therefore, failing to reach a position on the base sufficiently close to the feed rotor where the feed rotor can grip the crop material. This results in a blockage of crop material in the conveying channel upstream of the feed rotor. This in turn requires the baler to be stopped to allow the blockage to be cleared, resulting in downtime, and in turn inefficient feeding of the crop material through the conveying channel. This is particularly a problem with wet crop materials, such as, for example, wet grass.

Attempts have been made to address this problem, one of which attempts is disclosed in U.S. Pat. No. 5,819,517, where the base of the conveying channel is resiliently supported adjacent its upstream end adjacent the pick-up mechanism. The spacing between the base of the conveying channel and the feed rotor is set in its normal operating state such that the spacing between the base and the feed rotor is suitable for accommodating swards of relatively low density and low volume per unit length. The resilient mounting of the base allows downward resilient displacement of the base relative to the feed rotor in order to increase the spacing between the base and the feed rotor for accommodating a sward of relatively high density or high volume per unit length. The resilience with which the base is mounted is such that in the event of an increase in the density or volume per unit length of the sward, the base is urged downwardly by the action of the feed rotor urging the crop material against the base in order to accommodate swards of higher density or higher volume per unit length and to avoid jamming of the crop material of such swards between the feed rotor and the base.

However, in the conveying device disclosed in U.S. Pat. No. 5,819,517 the base is pivotally mounted at its downstream end, and is resiliently mounted adjacent its upstream end, which is upstream of the feed rotor. Thus, in order to achieve a sufficient spacing between the base and the feed rotor to accommodate crop material of swards of relatively high density or relatively high volume per unit length, the displacement of the upstream end of the base of the conveying channel where it is resiliently supported is significantly greater than the displacement between the base and the feed rotor. This, it has been found, does not adequately solve the problem of the inability of conveying devices to convey crop material of both relatively high density or relatively high volume per unit length and crop material of swards of relatively low density and relatively low volume per unit length.

A further problem with many such conveying devices which are unable to cope with crop material which is presented in swards of both relatively high density or relatively high volume per unit length and relatively low density or relatively low volume per unit length is that jamming of the crop material between the feed rotor and the base of such conveying devices can occur when the crop material is presented in a sward of relatively high density or relatively high volume per unit length. This causes a further problem, in that in such conveying devices, the feed rotor, in general, is driven through an automatic torque limiting cut-out clutch, and the cut-out torque of the cut-out clutch, in general, is set so that in the event of a jam of the crop material between the feed rotor and the base, the cut-out clutch activates in order to disengage the feed rotor from the drive transmission of the conveying device. Once such automatic torque limiting cut-out clutches are activated to disengage the feed rotor from the drive transmission, in general, drive to the conveying device must be stopped and restarted in order to re-engage the cut-out clutch, to in turn re-engage the feed rotor with the drive transmission. This is an inconvenient and time-consuming task, and leads to further inefficient feeding of the crop material to the baler.

There is therefore a need for a conveying device which addresses at least some of the above discussed problems.

The present invention is directed towards providing such a conveying device, and the invention is also directed towards a method for conveying material through a conveying channel. Additionally, the invention is directed towards a baler comprising the conveying device.

According to the invention there is provided a conveying device comprising a longitudinally extending conveying channel extending between an upstream end and a downstream end, the conveying channel having a base extending longitudinally between the upstream end and the downstream end of the conveying channel, a feed rotor located in the conveying channel and rotatable about a transversely extending rotational axis for urging material through the conveying channel, wherein the base of the conveying channel comprises an upstream base part extending between an upstream end and a downstream end thereof, and a downstream base part extending between an upstream end and a downstream end thereof, the upstream base part and the downstream base part being arranged sequentially in the conveying channel with the downstream end of the upstream base part terminating adjacent the upstream end of the downstream base part, the downstream end of the upstream base part being supported by a first resilient support means in a normal operating state thereof to define an upstream portion of the base of the conveying channel, and being urgeable against the first resilient support means from the normal operating state thereof away from the conveying channel in response to the force with which the material is being urged against the downstream end of the upstream base part by the feed rotor exceeding a first predefined value, and the upstream end of the downstream base part being supported by a second resilient support means in a normal operating state thereof to define a downstream portion of the base of the conveying channel, and being urgeable against the second resilient support means from the normal operating state thereof away from the conveying channel in response to the force with which the material is being urged against the upstream end of the downstream base part by the feed rotor exceeding a second predefined value.

In one aspect of the invention the downstream end of the upstream base part is freely supported on the first resilient support means in the normal operating state thereof. Preferably, the first resilient support means is compressively resilient.

Advantageously, the first resilient support means comprises at least one first resilient support member. Ideally, the first resilient support means comprises a pair of the first resilient support members spaced apart transversely from each other.

In another aspect of the invention the respective first resilient support members are located to respective opposite sides of a longitudinally extending centreline of the upstream base part. Preferably, each first resilient support member is located approximately midway between the longitudinal centreline of the upstream base part and a corresponding side edge of the upstream base part.

In one embodiment of the invention each first resilient support member is of circular transverse cross-section.

Preferably, the first resilient support means comprises a rubber or a rubber-like material.

In one aspect of the invention the first resilient support means is configured to permit displacement of the downstream end of the upstream base part between the normal operating state thereof and a maximum displaced operating state thereof. Preferably, the displacement of the downstream end of the upstream base part from the normal operating state thereof to the maximum displaced operating state thereof does not exceed 50 mm. Advantageously, the displacement of the downstream end of the upstream base part from the normal operating state thereof to the maximum displaced operating state thereof does not exceed 30 mm. Ideally, the displacement of the downstream end of the upstream base part from the normal operating state thereof to the maximum displaced operating state thereof lies in the range of 20 mm to 25 mm.

In one aspect of the invention the first resilient support means is configured to commence to yield to permit the downstream end of the upstream base part to commence displacement from the normal operating state thereof when the force with which the material is being urged by the feed rotor against the downstream end of the upstream base part exceeds the first predefined value.

In another aspect of the invention the first resilient support means is configured to permit progressive displacement of the downstream end of the upstream base part from the normal operating state thereof in response to the force with which the material is being urged by the feed rotor against the downstream end of the upstream base part progressively increasing above the first predefined value.

Preferably, the first resilient support means is configured so that the maximum displacement of the downstream end of the upstream base part to the maximum displaced operating state thereof occurs when the force with which the material is being urged by the feed rotor against the downstream end of the upstream base part reaches a first upper predefined value. Advantageously, the first upper predefined value lies in the range of 500 Newtons to 1,200 Newtons. Ideally, the first upper predefined value is approximately 1,000 Newtons.

In another aspect of the invention the first predefined value lies in the range of 100 Newtons to 400 Newtons. Preferably, the first predefined value is approximately 200 Newtons.

In one aspect of the invention the downstream end of the upstream base part is urgeable against the first resilient support means from the normal operating state thereof in a generally downwardly direction in response to the force with which the material is being urged against the downstream end of the upstream base part by the feed rotor exceeding the first predefined value.

In another aspect of the invention the upstream base part is pivotally mounted adjacent the upstream end thereof about a substantially transversely extending first pivot axis.

Preferably, the upstream base part is pivotally mounted about the first pivot axis by a resilient pivot mounting means. Advantageously, the resilient pivot mounting means comprises at least one resilient mounting element defining the first pivot axis extending therethrough. Preferably, the resilient pivot mounting means comprises a pair of elongated transversely extending spaced apart plate members with the at least one resilient mounting element located between and sandwiched between the transverse plate members. In another aspect of the invention the upstream end of the upstream base part terminates adjacent the upstream end of the channel.

In one aspect of the invention the second resilient support means is configured for urging the upstream end of the downstream base part into the normal operating state thereof. Preferably, the second resilient support means is compressively resilient.

In another aspect of the invention the upstream end of the downstream base part is supported on the second resilient support means through at least one carrier arm, the carrier arm being pivotally mounted about a transversely extending carrier arm pivot axis spaced apart from the upstream end of the downstream base part. Preferably, the at least one carrier arms are located on one side of the downstream base part. Advantageously, the carrier arm pivot axis is spaced apart from the upstream end of the downstream base part in an upstream direction from the upstream end of the downstream base part. Ideally, the carrier arm pivot axis is disposed below the upstream base part.

Preferably, the at least one carrier arm is coupled to the second resilient support means at a location spaced apart from the carrier arm pivot axis. Advantageously the at least one carrier arm is coupled to the second resilient support means at a location spaced apart from the upstream end of the downstream base part. Preferably, the at least one carrier arm is coupled to the second resilient support means at a location generally downstream of the upstream end of the downstream base part.

In one aspect of the invention the upstream end of the downstream base part is pivotally coupled to the at least one carrier arm about a transversely extending intermediate pivot axis. Preferably, the upstream end of the downstream base part is pivotally coupled to the at least one carrier arm by a transversely extending intermediate pivot shaft defining the transversely extending intermediate pivot axis.

In another aspect of the invention a pair of the carrier arms are provided transversely spaced apart from each other and located to respective opposite sides of the downstream base part, the carrier arms defining the carrier arm pivot axis as a common carrier arm pivot axis, and being coupled to the second resilient support means. Preferably, each carrier arm is coupled to the second resilient support means by a corresponding connecting member extending from the carrier arm and terminating in a corresponding upper plate member, the upper plate member being supported on the second resilient support means.

In one aspect of the invention the second resilient support means comprises a second resilient support member corresponding to each carrier arm, each second resilient support member being located to the side of the downstream base part to which the corresponding carrier arm is located. Advantageously, each second resilient support member is of circular transverse cross-section. Preferably, each second resilient support member is provided with an elongated bore extending therethrough for accommodating the corresponding connecting member extending therethrough from the corresponding carrier arm to the corresponding upper plate member.

In one aspect of the invention the second resilient support means comprises a rubber or rubber-like material. Preferably, the second resilient support means is configured to permit displacement of the upstream end of the downstream base part between the normal operating state thereof and a maximum displaced operating state thereof. Advantageously, the displacement of the upstream end of the downstream base part from the normal operating state thereof to the maximum displaced operating state thereof does not exceed 50 mm. Preferably, the displacement of the upstream end of the downstream base part from the normal operating state thereof to the maximum displaced operating state thereof does not exceed 30 mm. Ideally, the displacement of the upstream end of the downstream base part from the normal operating state thereof to the maximum displaced operating state thereof lies in the range of 20 mm to 25 mm.

In one aspect of the invention the second resilient support means is configured to commence to yield to permit the upstream end of the downstream base part to commence displacement from the normal operating state thereof when the force with which the material is being urged by the feed rotor against the upstream end of the downstream base part exceeds the second predefined value. Preferably, the second resilient support means is configured to permit progressive displacement of the upstream end of the downstream base part from the normal operating state thereof in response to the force with which the material is being urged by the feed rotor against the upstream end of the downstream base part progressively increasing above the second predefined value.

In another aspect of the invention the second resilient support means is configured so that the maximum displacement of the upstream end of the downstream base part to the maximum displaced operating state thereof occurs when the force with which the material is being urged by the feed rotor against the upstream end of the downstream base part reaches a second upper predefined value. Preferably, the second upper predefined value lies in the range of 4,000 Newtons to 8,000 Newtons. Advantageously, the second upper predefined value is approximately 6,000 Newtons.

In another aspect of the invention the second predefined value lies in the range of 2,000 Newtons to 4,000 Newtons. Preferably, the second predefined value is approximately 3,000 Newtons.

In another aspect of the invention the upstream end of the downstream base part is urgeable against the second resilient support means from the normal operating state thereof in a generally downwardly direction in response to the force with which the material is being urged against the upstream end of the downstream base part by the feed rotor exceeding the second predefined value.

In a further aspect of the invention the downstream base part is pivotally mounted towards the downstream end thereof about a substantially transversely extending second pivot axis. Preferably, the second pivot axis is defined by a pivotal connection to the downstream base part of a main urging means configured for urging the downstream base part about the intermediate pivot axis between an operative state defining the conveying channel, and an inoperative state for facilitating clearing a blockage from the conveying channel. Advantageously, the main urging means comprises one of hydraulically powered ram and pneumatically powered ram. Preferably, a pair of transversely spaced apart main urging means are provided to respective opposite sides of the conveying channel.

In another aspect of the invention the downstream base part terminates at its downstream end adjacent the downstream end of the conveying channel.

In a further aspect of the invention the first and second resilient support means are independent of each other.

In one aspect of the invention the first and second predefined values are different. Alternatively, the first and second predefined values are similar.

In another aspect of the invention the first and second upper predefined values are different. Alternatively, the first and second upper predefined values are similar.

In another aspect of the invention the downstream end of the upstream base part is located beneath the feed rotor. Preferably, the downstream end of the upstream base part is located below the rotational axis of the feed rotor.

Preferably, the rotational axis of the feed rotor lies adjacent a transverse plane extending substantially perpendicularly from the base of the conveying channel adjacent the downstream end of the upstream base part. Advantageously, the rotational axis of the feed rotor is substantially contained in the transverse plane extending substantially perpendicularly from the base of the conveying channel adjacent the downstream end of the upstream base part.

In another aspect of the invention the upstream end of the downstream base part is located beneath the feed rotor.

In a further aspect of the invention the upstream end of the downstream base part is located below the rotational axis of the feed rotor.

In one aspect of the invention the rotational axis of the feed rotor lies adjacent a transverse plane extending substantially perpendicularly from the base of the conveying channel adjacent the upstream end of the downstream base part. Preferably, the rotational axis of the feed rotor is substantially contained in the transverse plane extending substantially perpendicularly from the base of the conveying channel adjacent the upstream end of the downstream base part.

In a further aspect of the invention the feed rotor comprises a transversely extending rotor shaft rotatably mounted about the transversely extending rotational axis, and a plurality of feed fingers extending substantially radially from the rotor shaft and spaced apart circumferentially around and spaced apart longitudinally along the rotor shaft.

In another aspect of the invention adjacent ones of the feed fingers are angularly off-set relative to each other around the rotor shaft.

Preferably, the feed fingers cooperate with the base of the conveying channel for urging material through the conveying channel.

Preferably, the upstream end of the conveying channel is configured for receiving the material from a pick-up means.

In one aspect of the invention the conveying device comprises the pick-up means.

Preferably, the pick-up means is located adjacent the upstream end of the conveying channel.

Advantageously, the pick-up means comprises a stripper plate terminating in a downstream end adjacent the upstream end of the conveying channel.

In another aspect of the invention the pick-up means comprises a rotatably mounted pick-up drum having a plurality of pick-up tines extending substantially radially therefrom spaced apart circumferentially around and spaced apart longitudinally along the drum, the pick-up tines extending through a plurality of longitudinally extending spaced apart tine accommodating slots extending through the stripper plate.

In a further aspect of the invention the conveying device comprises a chassis, and the first resilient support means and the second resilient support means are mounted on the chassis.

Preferably, the upstream base part adjacent the upstream end thereof is pivotally coupled to the chassis about the first pivot axis.

Advantageously, the downstream base part is pivotally coupled to the chassis towards the downstream end of the downstream base part about the second pivot axis.

Preferably, the at least one carrier arm is pivotally coupled to the chassis about the carrier arm pivot axis.

In one aspect of the invention the feed rotor is rotatably mounted on the chassis about the rotational axis thereof.

In another aspect of the invention the main urging means is coupled between the chassis and the downstream base part.

In a further aspect of the invention the chassis is carried on at least one ground engaging wheel.

Preferably, the chassis is carried on a pair of transversely spaced apart ground engaging wheels located at respective opposite sides of the chassis.

In one aspect of the invention the conveying channel is configured for feeding the material to a baler. Preferably, the conveying channel is configured for feeding the material to a round baler.

In another aspect of the invention the conveying channel is configured for conveying crop material therethrough. Preferably, the conveying channel is configured for conveying one of grass, silage, hay and straw therethrough.

The invention also provides a baler comprising the conveying device according to the invention. Preferably, the baler comprises a round baler configured for producing a cylindrical bale of material.

Additionally, the invention provides a method for conveying material through a conveying channel, the conveying channel having a base extending between an upstream end and a downstream end, and a feed rotor located in the conveying channel and rotatable about a transversely extending rotational axis for urging the material through the conveying channel, the method comprising configuring the base with an upstream base part extending between an upstream end and a downstream end and a downstream base part extending between an upstream end and a downstream end, sequentially arranging the upstream and downstream base parts with the downstream end of the upstream base part terminating adjacent the upstream end of the downstream base part, supporting the downstream end of the upstream base part on a first resilient support means in a normal operating state thereof to define an upstream portion of the base of the conveying channel, supporting the upstream end of the downstream base part on a second resilient support means in a normal operating state thereof to define a downstream portion of the base of the conveying channel, permitting the downstream end of the upstream base part to be urged against the first resilient support means from the normal operating state thereof away from the conveying channel in response to the force with which the material is being urged against the downstream end of the upstream base part by the feed rotor exceeding a first predefined value, and permitting the upstream end of the downstream base part to be urged against the second resilient support means from the normal operating state thereof away from the conveying channel in response to the force with which the material is being urged against the upstream end of the downstream base part by the feed rotor exceeding a second predefined value.

Further, the invention provides a conveying device comprising a longitudinally extending conveying channel extending between an upstream end and a downstream end and configured to receive material, the conveying channel having a base extending longitudinally between the upstream end and the downstream end of the conveying channel, a feed rotor located in the conveying channel and rotatable about a transversely extending rotational axis for urging the material through the conveying channel, wherein the base of the conveying channel comprises an upstream base part extending between an upstream end and a downstream end thereof, the downstream end of the upstream base part being supported by a first resilient support means in a normal operating state thereof to define an upstream portion of the base of the conveying channel, and being urgeable against the first resilient support means from the normal operating state thereof away from the conveying channel in response to the force with which the material is being urged against the downstream end of the upstream base part by the feed rotor exceeding a first predefined value.

The invention also provides a baler comprising the conveying device according to the invention.

Further, the invention provides a method for conveying material through a conveying channel, the conveying channel having a base extending between an upstream end and a downstream end, and a feed rotor located in the conveying channel and rotatable about a transversely extending rotational axis for urging the material through the conveying channel, the method comprising configuring the base with an upstream base part extending between an upstream end and a downstream end, supporting the downstream end of the upstream base part on a first resilient support means in a normal operating state thereof to define an upstream portion of the base of the conveying channel, permitting the downstream end of the upstream base part to be urged against the first resilient support means from the normal operating state thereof away from the conveying channel in response to the force with which the material is being urged against the downstream end of the upstream base part by the feed rotor exceeding a first predefined value.

The advantages of the invention are many. A particularly important advantage of the invention is that the conveying device according to the invention is particularly suitable for conveying crop material over a wide range of swards thereof from swards of both relatively high density or relatively high volume per unit length to swards of relatively low density and low volume per unit length of the sward. It is believed that this advantage has been achieved by virtue of the fact the upstream base part is freely supported on the first resilient support means, and is displaceable from the normal operating state away from the conveying channel when the force with which the crop material is being urged by the feed rotor against the downstream end of the upstream base part exceeds the first predefined value, and particularly when the first predefined value lies in the range of 100 Newtons to 400 Newtons. This advantage is further enhanced when the upstream base part is pivotally mounted about the first pivot axis adjacent its upstream end, and the downstream end thereof terminates substantially adjacent the feed rotor, since the maximum displacement of the upstream base part from the normal operating state thereof occurs where it is most required, namely, adjacent the feed rotor, and thus even when the downstream end of the upstream base part is displaced from its normal operating state during conveying of crop material the displacement of the upstream base part from its normal operating state towards its upstream end on the upstream side of the feed rotor is significantly less than the displacement adjacent the feed rotor.

Accordingly, since the conveying device is suitable for handling crop material of swards from swards of relatively high density or relatively high volume per unit length of sward to swards of relatively low density or low volume per unit length, without jamming of the crop material between the base and the feed rotor, jamming of crop material in the conveying channel is substantially eliminated, or at least significantly reduced. This, thus, in turn minimises downtime of the baler or other machine which is being fed with crop material by the conveying device. Since jamming of crop material in the conveying device according to the invention is substantially eliminated or at least significantly reduced, the number of times the automatic torque limiting cut-out clutch is activated is also reduced, thereby leading to further reduction in the downtime of the baler or other machine to which crop material is being conveyed by the conveying device according to the invention.

A further advantage of the invention is achieved when the upstream base part is pivotally coupled adjacent the upstream end thereof about the first transversely extending pivot axis by the resilient pivot mounting means. The pivoting of the upstream base part by the resilient pivot mounting means results in the downstream end of the upstream base part being urged stably and firmly against the first resilient support means, which among other advantages reduces noise.

A further advantage of the invention is achieved by supporting the intermediate pivot shaft on the carrier arms, which are in turn pivotally coupled relative to the conveying device about the carrier arm pivot axis, in that while the intermediate shaft is pivotal downwardly about the carrier arm pivot axis in order to facilitate downward displacement of the upstream end of the downstream base part when the downstream base part is pivoting about the second pivot axis, in order to avoid jamming of crop material between the feed rotor and the downstream base part, the downstream base part is also pivotal downwardly about the intermediate shaft by the main urging means for lowering the downstream end of the downstream base part for facilitating cleaning out the conveying channel, and any jams which still occur.

A particularly important advantage of the invention is that by resiliently supporting the upstream base part adjacent its downstream end, and the downstream end adjacent its upstream end when the downstream end of the upstream base part and the upstream end of the downstream base part are located substantially beneath the feed rotor is that the maximum displacement of the upstream and downstream base parts occurs where it is actually required, namely, adjacent the feed rotor. This, thus, avoids unnecessary excessive displacement of the upstream and downstream base parts which in general is a feature of resiliently supported bases of conveying channels known heretofore.

Another advantage of the invention is that by virtue of the fact that both the upstream and downstream base parts are resiliently supported adjacent their downstream and upstream ends, respectively, adjacent the feed rotor is that hard objects, such as stones or other solid objects which would otherwise result in damage to either the upstream and downstream base parts and/or to the feed rotor can pass through the conveying channel without resulting in damage to either the upstream and downstream base parts or to the feed rotor, or with minimal damage thereto.

A still further advantage of the invention is that by virtue of the fact that the downstream end of the upstream base part and the upstream end of the downstream base part are resiliently mounted, and the upstream and downstream ends of the upstream and downstream base parts, respectively, are pivotally mounted, the risk of crop material becoming jammed on the upstream base part upstream of the feed rotor is essentially eliminated. Accordingly, crop material is efficiently conveyed through the conveying channel.

Figure 2:
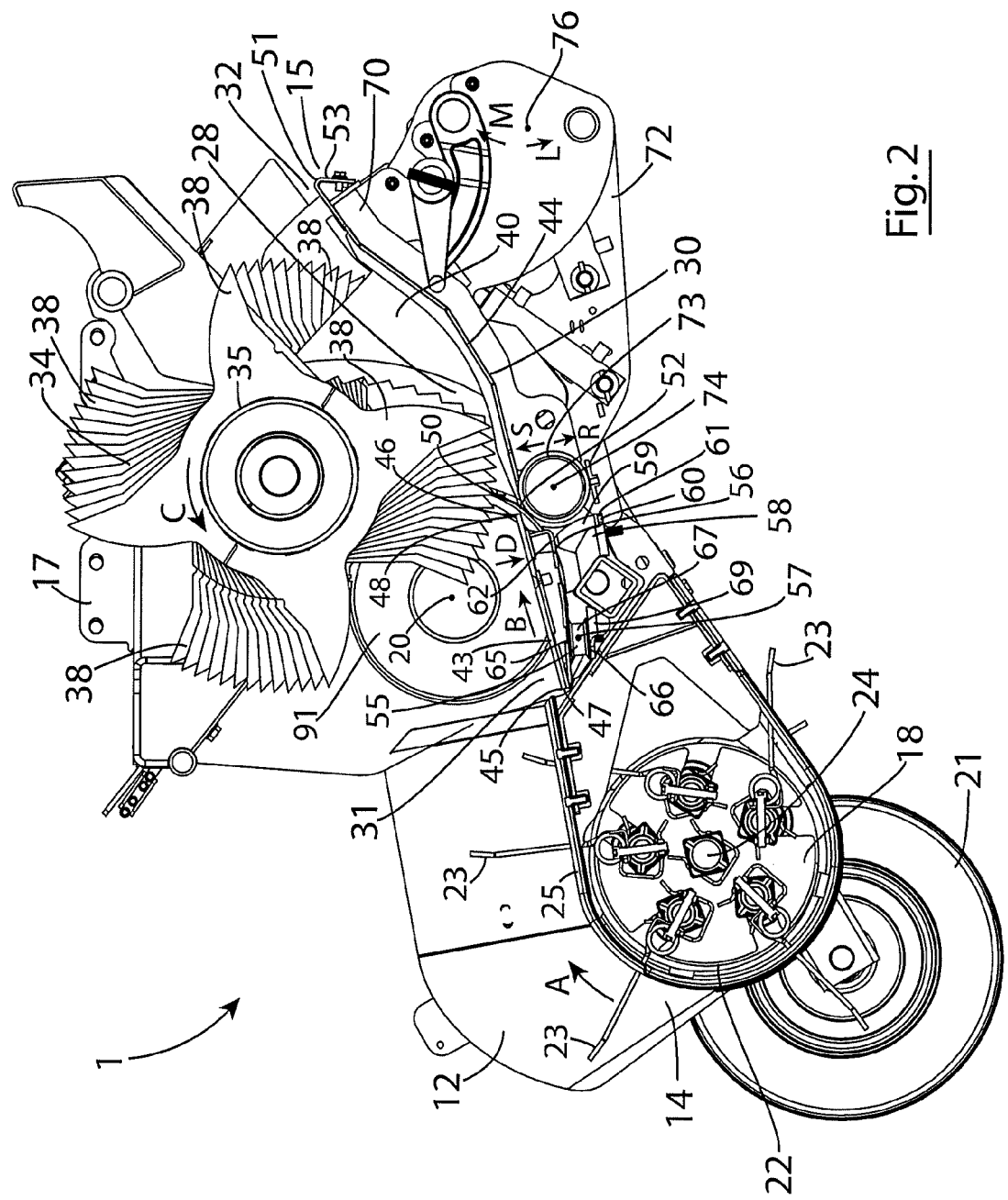
Figure 3:
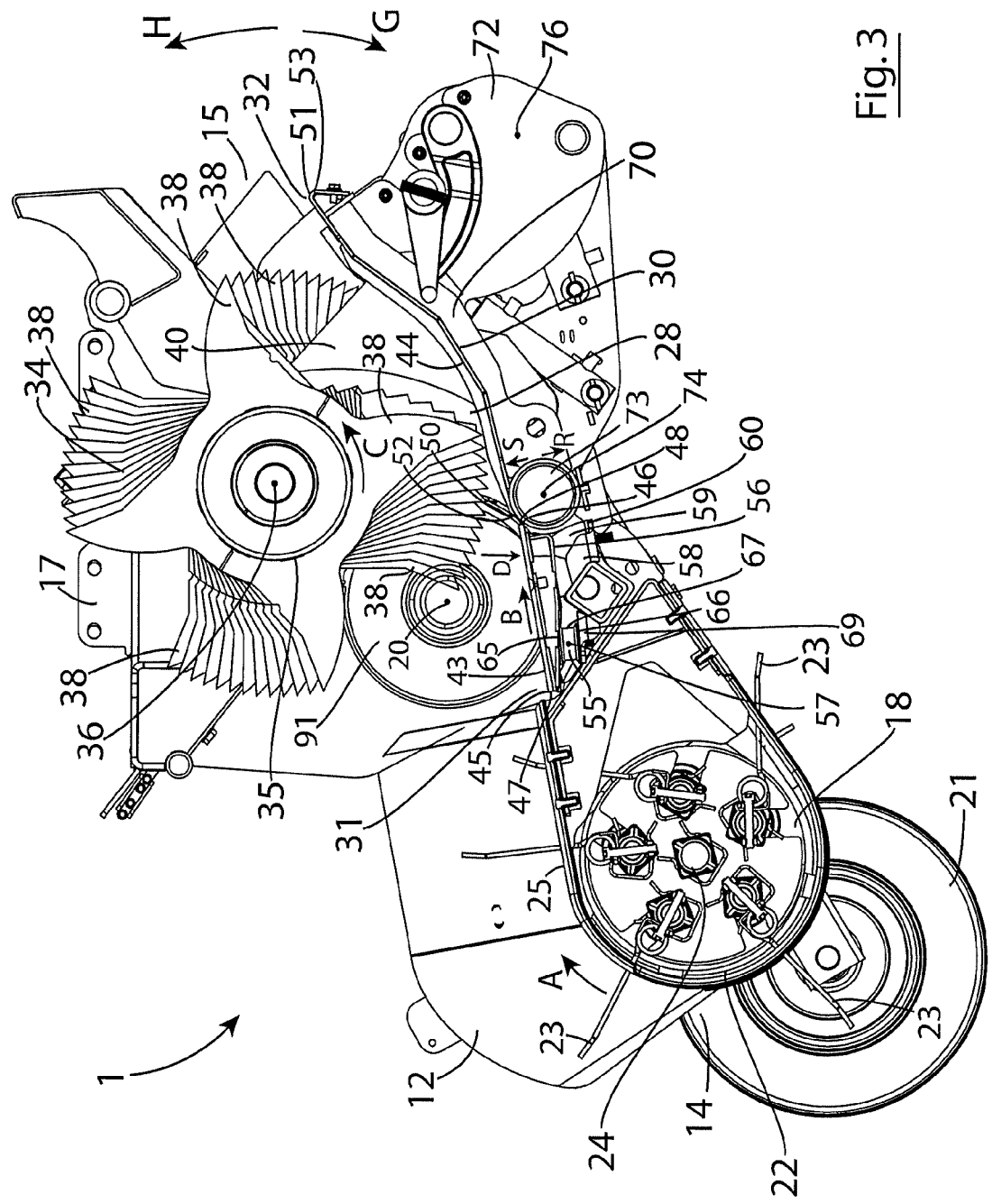
Figure 4:
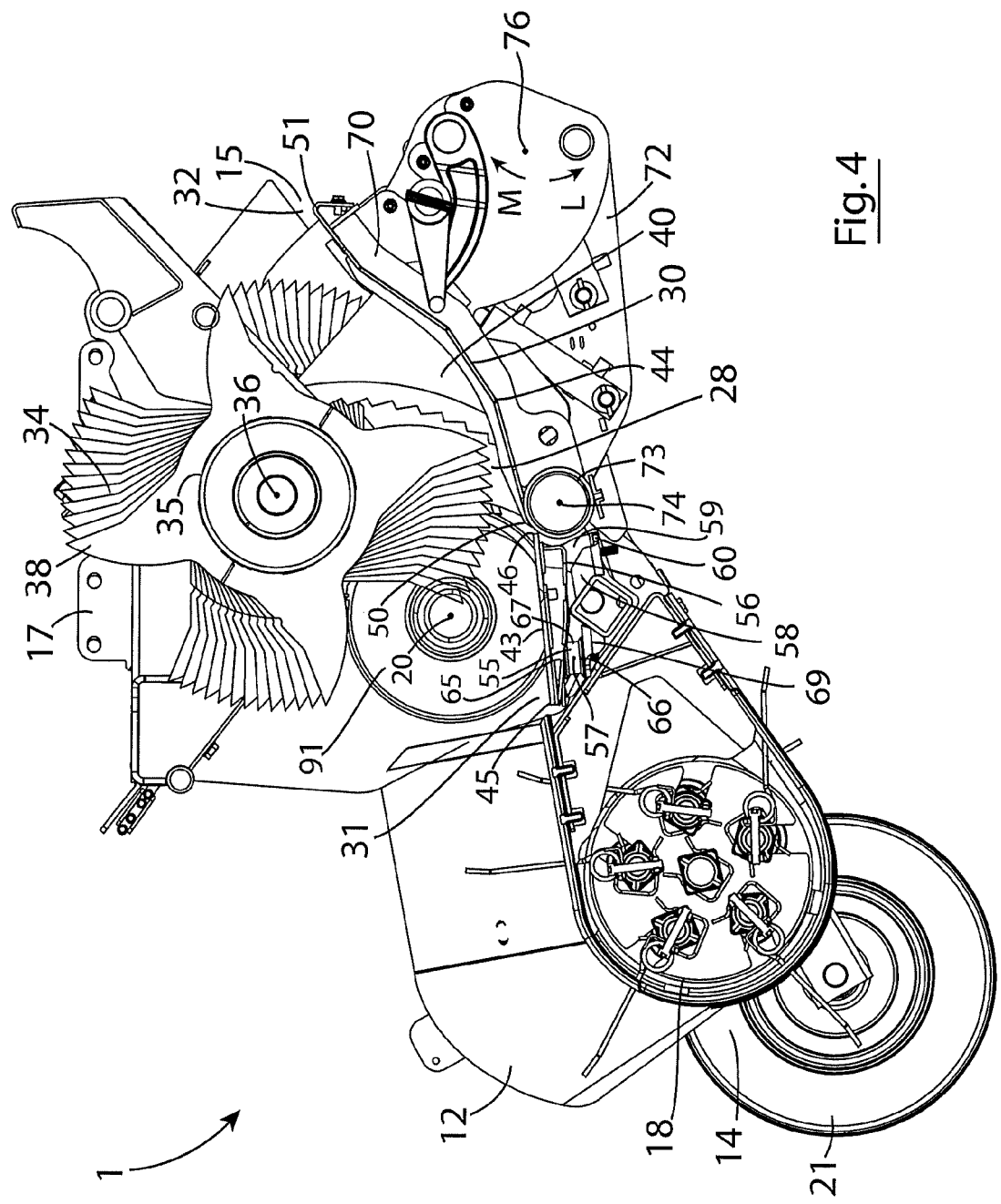
Figure 5:
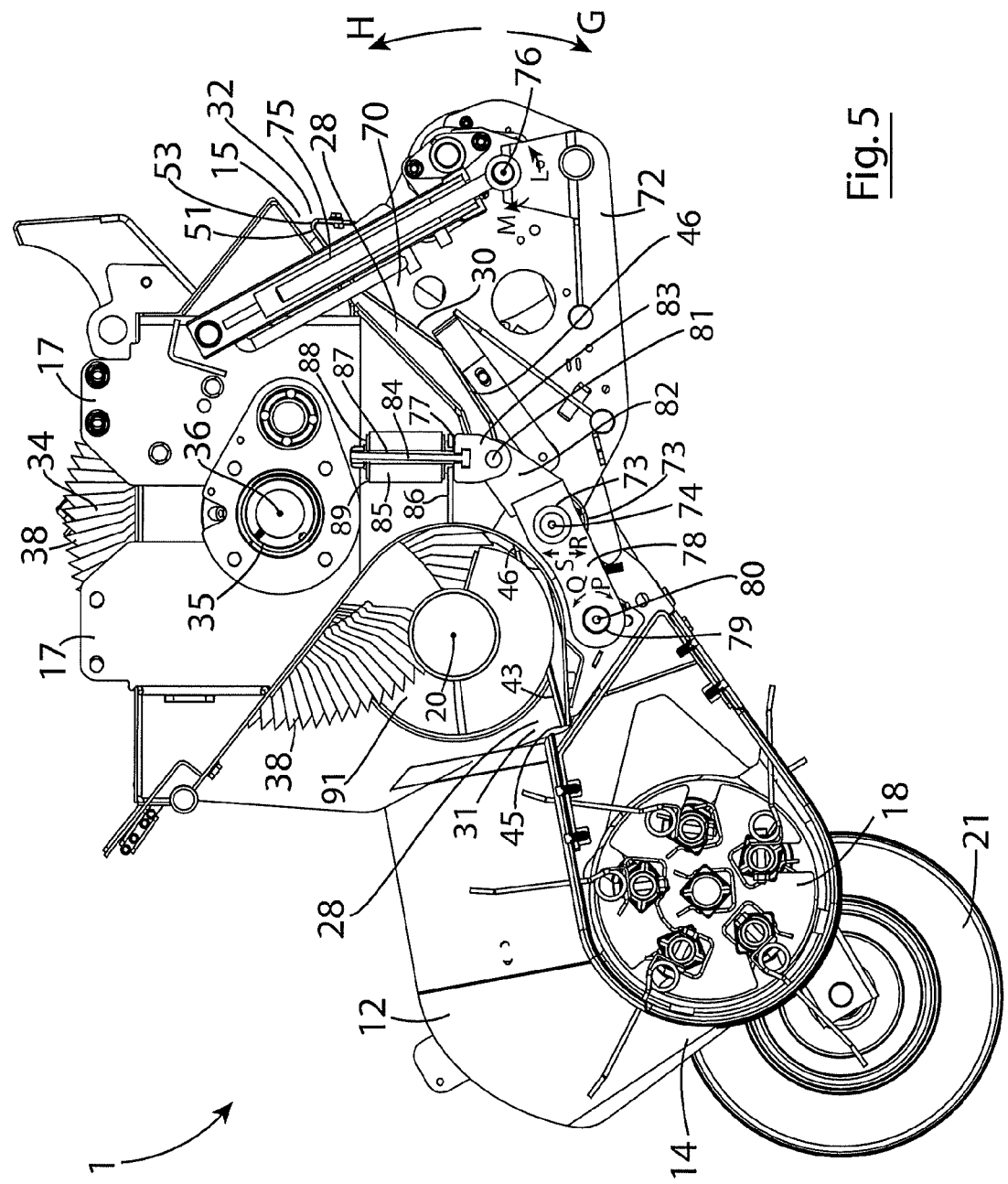
Figure 6:
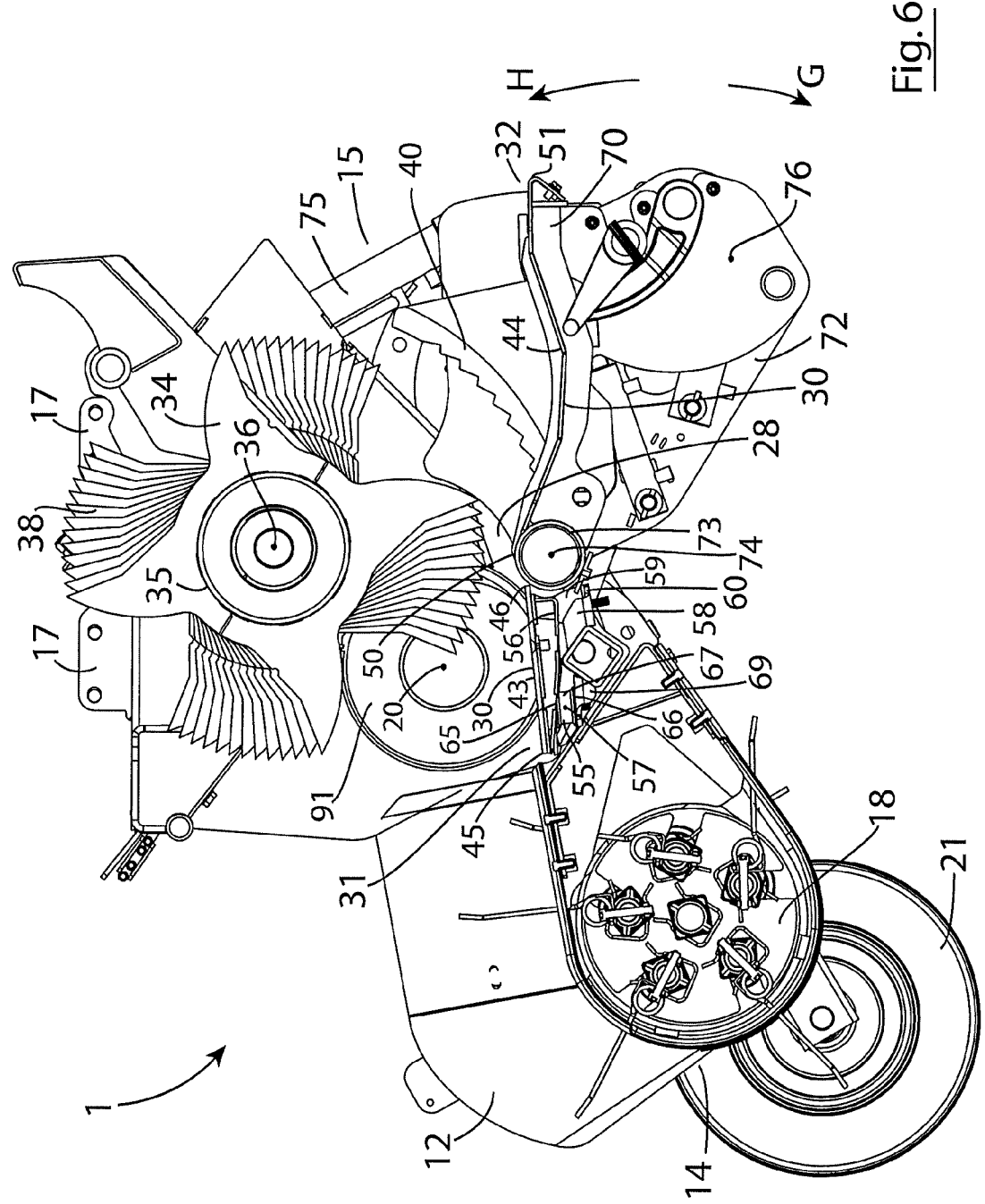
Figure 7:
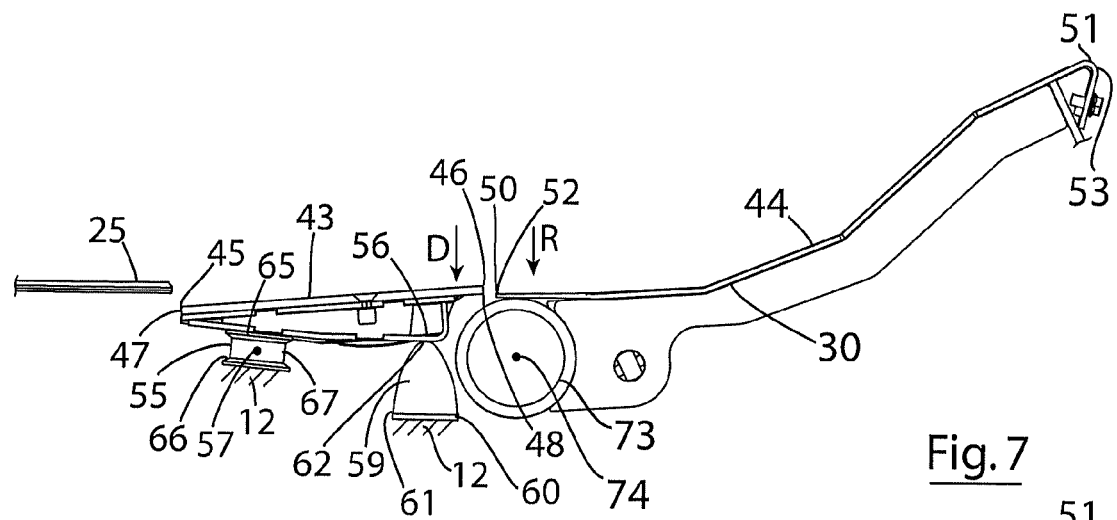
Figure 8:
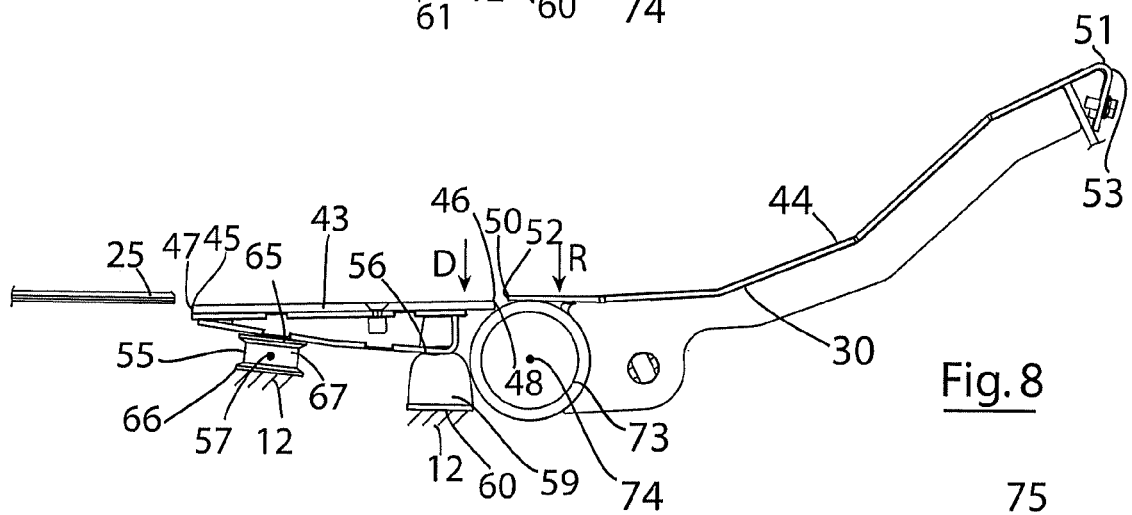
Figure 9:
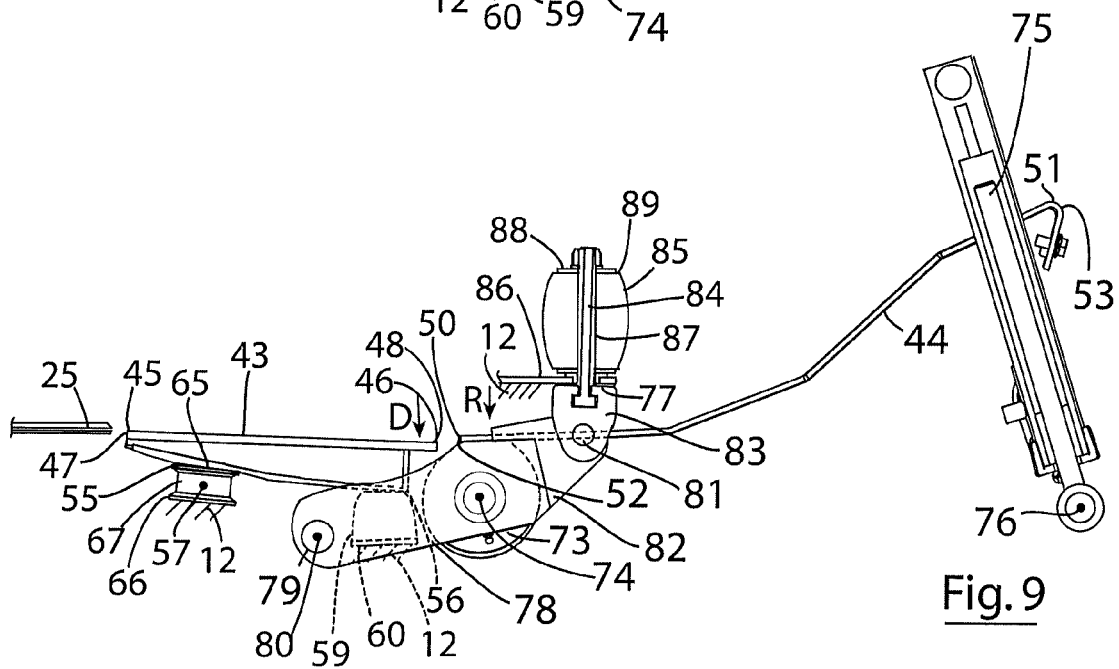
Figure 11:
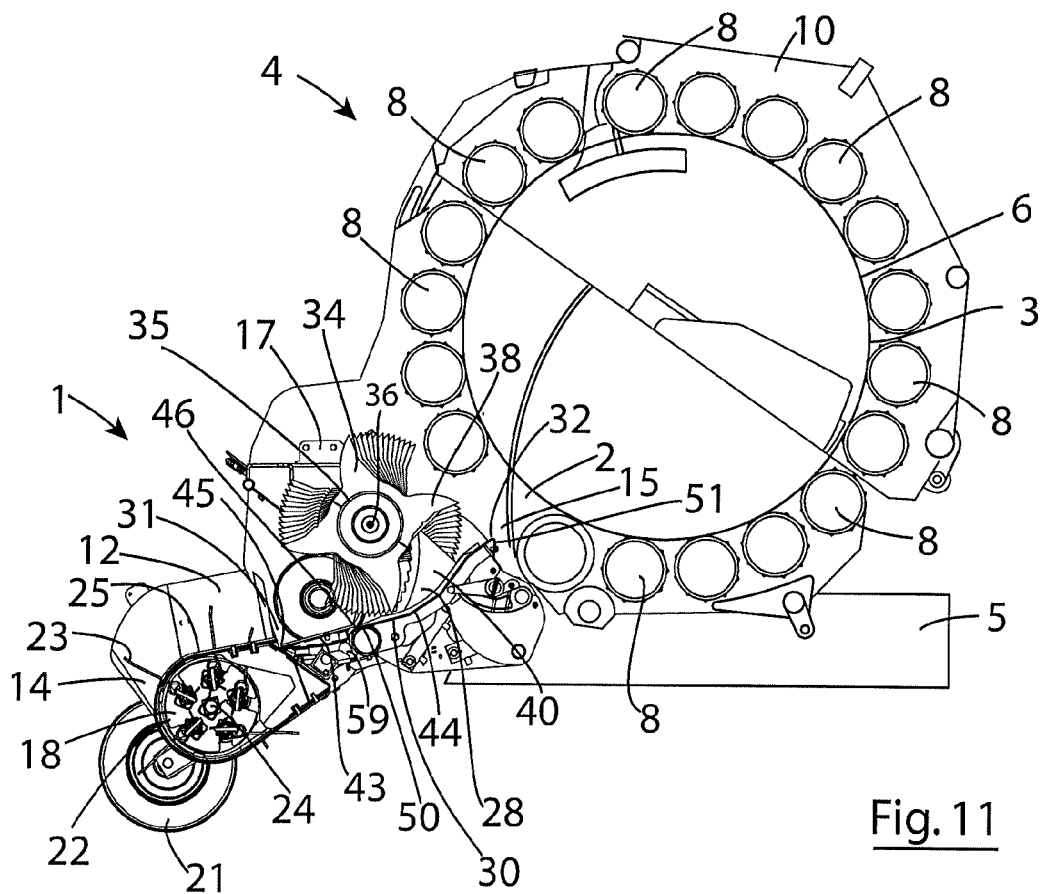
Figure 10:
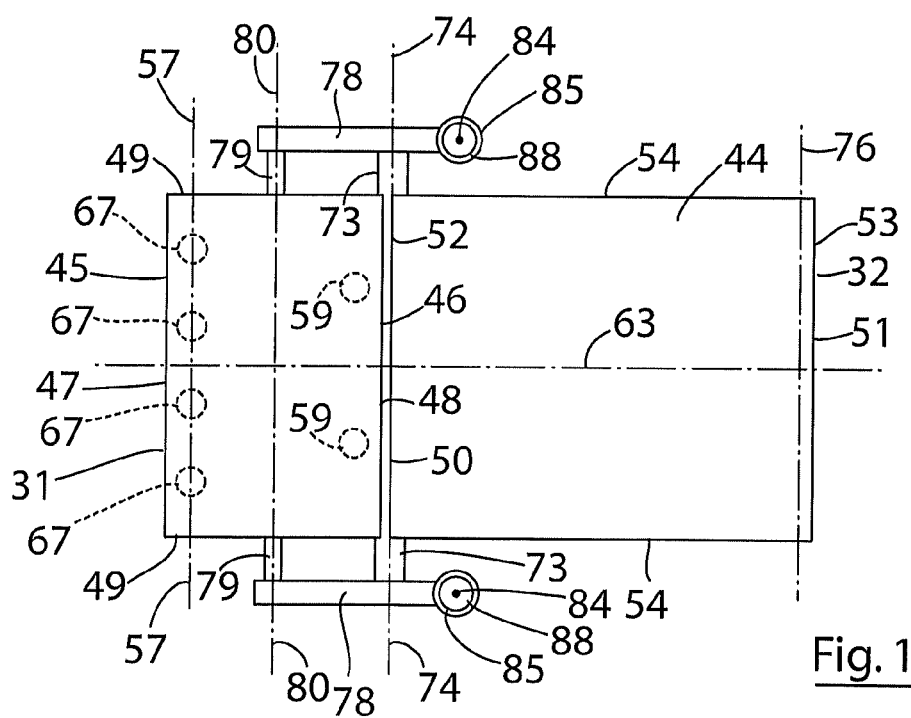

The invention will be more clearly understood from the following description of a preferred embodiment thereof which is given by way of example only with reference to the accompanying drawing, in which:

FIG. 1 is a perspective view of a conveying device for conveying crop material to a baler, FIG. 2 is a cross-sectional side elevational view of the conveying device of FIG. 1, FIG. 3 is a view similar to that of FIG. 2 of the conveying device of FIG. 1 illustrating a portion of the conveying device in a different state to that of FIG. 2, FIG. 4 is a view similar to that of FIG. 2 of the conveying device of FIG. 1 illustrating the portion of the conveying device in a further different state to that of FIG. 2, FIG. 5 is a cross-sectional side elevational view of the conveying device of FIG. 1, sectioned at a different location to that of FIG. 2, FIG. 6 is a view similar to that of FIG. 2 of the conveying device of FIG. 1 illustrating another portion of the conveying device in a different state to that of FIG. 3, FIG. 7 is a simplified side elevational view of a portion of the conveying device of FIG. 1, FIG. 8 is a simplified side elevational view similar to that of FIG. 7 but with portions of the conveying device in a different state to that of FIG. 7, FIG. 9 is a simplified side elevational view of the portion of the conveying device of FIG. 7 but with additional components added thereto, FIG. 10 is a simplified diagrammatic top plan view of the portion of FIG. 9 of the conveying device of FIG. 1, and FIG. 11 is a cross-sectional side elevational view of a substantial portion of a round baler, also according to the invention, comprising the conveying device of FIG. 1 coupled thereto.

Referring to the drawings there is illustrated a conveying device according to the invention indicated generally by the reference numeral 1 for conveying crop material, for example, grass, silage, hay, straw and the like to an inlet opening 2 of a bale forming chamber 3 of a baler 4. The baler 4 is illustrated in outline in FIG. 9. In this embodiment of the invention the baler 4 is a fixed chamber baler configured for producing a cylindrical bale 6 of the crop material. The baler 4 comprises a chassis 5 carried on a pair of ground engaging wheels (not shown) but will be well known to those skilled in the art. Circumferentially arranged bale forming rollers 8 are rotatably mounted in and between spaced apart side walls 10, and define with the side walls 10 the bale forming chamber 3 within which the bale 6 is formed. The side walls 10 are carried on the chassis, either directly or indirectly. Such fixed chamber balers 4 will be well known to those skilled in the art. A typical roller or fixed chamber baler 4 is disclosed in PCT Specification No. WO 02/076184. However, the conveying device 1 may be used in conjunction with any type of round baler, be it a fixed chamber baler, a belt baler, or a baler which includes a combination of bale forming rollers and one or more belts. The conveying device 1 may also be used in combination with a tapered roller baler. It will also be appreciated that the conveying device 1 may be used in conjunction with a square baler, a forage wagon, or indeed any crop harvesting or processing machine or apparatus, as well as other material harvesting and processing apparatus, for example, waste material harvesting apparatus.

The conveying device 1 comprises a chassis formed by a framework 12 extending between an upstream end 14 and a downstream end 15. Mounting brackets 17 on respective opposite sides of the framework 12 are provided for coupling the conveying device 1 to the baler 4.

A pick-up means comprising a pick-up mechanism 18 for picking up crop material from the ground is located at the upstream end 14 of the framework 12, and is pivotally coupled to the framework 12 about a pair of pivot shafts (not shown) which are rotatably mounted in respective opposite sides of the framework 12, and which define a common pivot axis 20 about which the pick-up mechanism is pivotal upwardly and downwardly relative to the framework 12. Ground engaging wheels 21 mounted on the pick-up mechanism 18 are provided for adjustably setting the height of the pick-up mechanism 18 above the ground, as will be understood by those skilled in the art. The pick-up mechanism 18 comprises a pick-up drum 22 and a plurality of circumferentially and longitudinally spaced apart tines 23 extending substantially radially from the drum 22. Shafts 24 extending from respective opposite ends of the pick-up drum 22 are rotatably mounted in the framework 12, and are driven by a drive transmission (not shown) for rotating the pick-up drum 22 in the direction of the arrow A. A stripper plate 25 extends partly around the pick-up drum 22. A plurality of elongated spaced apart parallel longitudinally extending slots 26 in the stripper plate 25 accommodate the tines 23 therethrough as the pick-up drum 22 rotates. The stripper plate 25 strips crop material from the tines 23 and transfers the crop material onto an elongated conveying channel 28 which extends longitudinally from the stripper plate 25 to the downstream end 15 of the framework 12, through which the crop material is conveyed to the inlet opening 2 of the bale forming chamber 3 of the baler 4.

The conveying channel 28 comprises a base 30 which extends the width of the conveying channel 28 and which extends from an upstream end 31 adjacent the stripper plate 25 of the pick-up mechanism 18 to a downstream end 32, which terminates adjacent the downstream end 15 of the framework 12.

A feed rotor 34 comprising a rotor shaft 35, which is rotatably carried in the framework 12, defines a transversely extending rotational axis 36 about which the feed rotor 34 is rotatable above the base 30 of the conveying channel 28. A plurality of feed fingers 38 extending radially from the rotor shaft 35 are spaced apart longitudinally along the rotor shaft 35 and are spaced apart circumferentially around the rotor shaft 35 for urging the crop material through the conveying channel 28 in the direction of the arrow B as the feed rotor 34 rotates in the direction of the arrow C. Adjacent ones of the longitudinally spaced apart feed fingers 38 are angularly off-set circumferentially relative to each other. The feed rotor 34 is driven through a drive transmission (not shown) and through an automatic torque limiting cut-out clutch (also not shown), and is rotated about the rotor 36 in the direction of the arrow C for urging crop material through the conveying chamber 28 in the direction of the arrow B from the upstream end 31 to the downstream end 32, and in turn through the inlet opening 2 into the bale forming chamber 3 of the baler 4.

In this embodiment of the invention a plurality of parallel transversely spaced apart knives 40 extend upwardly into the conveying channel 28 and cooperate with the feed fingers 38 for chopping the crop material into short length as the crop material is urged past the knives 40 by the feed fingers 38. The knives 40 may be mounted on the base 30, and would extend from the base into the conveying channel 28. In this embodiment of the invention the knives 40 are carried on a transversely extending carrier (not shown), which is located beneath the base 30, and the knives 40 extend from the carrier (not shown) through slots 41 in the base 30 into the conveying channel 28, see FIG. 1. The carrier (not shown) is operably mounted in the framework 12 for selectively urging the knives 40 into and out of the conveying channel 28, depending on whether or not chopping of the crop material being urged through the conveying channel 28 is required. It is also envisaged that the conveying device 1 may be provided without the knives, and in which case, the feed rotor 34 would act solely to urge the crop material through the conveying channel 28.

The base 30 of the conveying channel comprises an upstream base part 43 and a downstream base part 44 which are arranged sequentially to form the base 30. The upstream base part 43 extends between an upstream end 45 and a downstream end 46. The upstream end 45 of the upstream base part 43 terminates in a transversely extending upstream edge 47 while the downstream end 46 thereof terminates in a transversely extending downstream edge 48. The upstream base part 43 defines respective opposite side edges 49 extending between the upstream and downstream edges 47 and 48, respectively. The downstream base part 44 extends between an upstream end 50 and a downstream end 51. The upstream end 50 of the downstream base part 44 terminates in a transversely extending upstream edge 52, while the downstream end 51 thereof terminates in a transversely extending downstream edge 53. The downstream base part 44 defines respective opposite side edges 54 which extend between the upstream and downstream edges 52 and 53, respectively. The upstream end 45 of the upstream base part 43 defines the upstream end 31 of the conveying channel 28, and terminates adjacent the stripper plate 25 of the pick-up mechanism 18. The downstream edge 48 of the downstream end 46 of the upstream base part 43 terminates adjacent the upstream edge 52 of the upstream end 50 of the downstream base part 44, and both the downstream end 46 of the upstream base part 43 and the upstream end 50 of the downstream base part 44 terminate beneath the feed rotor 34. The downstream edge 53 of the downstream end 51 of the downstream base part 44 defines the downstream end 32 of the conveying channel 28.

The upstream base part 43 is pivotally mounted adjacent the upstream end 45 thereof by a resilient pivot mounting 55 defining a transversely extending first pivot axis 57 about which the upstream base part 43 is pivotal relative to the framework 12. The resilient pivot mounting 55 is described in detail below.

The upstream base part 43 is freely supported adjacent the downstream end 46 by a first resilient support means in a normal operating state, illustrated in FIGS. 2 and 7, defining an upstream portion of the base 10. The first resilient support means, which are described below, allows downward displacement of the downstream end 46 of the upstream base part 43 in the direction of the arrow D about the first pivot axis 57 from the normal operating state, in response to the force with which the crop material is being urged against the downstream end 46 of the upstream base part 43 by the feed rotor 34 exceeding a first predefined value, which could arise in the event of the crop material becoming jammed, or about to become jammed, between the feed rotor 34 and the upstream base part 43. The first predefined value of the force is described below. In this embodiment of the invention the first resilient support means comprises a pair of transversely spaced apart first resilient support members 59, which are mounted on a transversely extending cross-member 60 mounted on the framework 12 by respective mounting brackets 58 on respective opposite sides of the framework 12.

Each first resilient support member 59 comprises an upwardly tapering block of circular transverse cross-section of a compressively resilient rubber or rubber-like material. The diameter of each first resilient support member 59 adjacent its base 61 is approximately 50 mm, and the height of each first resilient support member 59 from the base 61 to its top 62 is approximately 60 mm. The first resilient support members 59 freely support the upstream base part 43 adjacent the downstream end 46, and are spaced apart transversely along the cross-member 60 and are located to engage and support the upstream base part 43 on respective opposite sides of a longitudinally extending centreline 63 of the upstream base part 43, and equi-spaced apart therefrom. In this embodiment of the invention the first resilient support members 59 are located on the cross-member 60 to engage and support the upstream base part 43 on respective opposite sides of the centreline 63 substantially midway between the centreline 63 and the corresponding side edges 49 of the upstream base part 43. In this embodiment of the invention the first resilient support members 59 engage an abutment member 56 which is mounted on and extends transversely across the upstream base part 43 adjacent the downstream end 46 thereof.

The first resilient support members 59 are configured to support and retain the downstream end 46 of the upstream base part 43 in the normal operating state illustrated in FIGS. 2 and 7 until the force with which the crop material, which is being urged through the conveying channel 28, is being urged against the downstream end 46 of the upstream base part 43 by the feed rotor 34 exceeds the first predefined value, which in this embodiment of the invention is approximately 200 Newtons. In other words the resilience and compressive strength of each of the first resilient support members 59 is such that neither of the first resilient support members 59 yield until the total load being supported by the first resilient support members 59 exceeds approximately 100 Newtons. Therefore, each first resilient support member 59 is configured to commence to yield when the load supported by that first resilient support member 59 exceeds approximately 100 Newtons. Accordingly, the first resilient support members 59 retain the downstream end 46 of the upstream base part 43 in the normal operating state thereof until the force with which the crop material is being urged against the downstream end 46 of the upstream base part 43 by the feed rotor 34 exceeds the first predefined value of 200 Newtons.

The downstream end 46 of the upstream base part 43 is displaceable downwardly in the direction of the arrow D against the first resilient support members 59 from the normal operating state to a maximum displaced operating state illustrated in FIGS. 4, 8 and 9. The downward displacement in the direction of the arrow D of the downstream end 46 of the upstream base part 43 from the normal operating state to the maximum displaced operating state is between 20 mm and 25 mm, and in this embodiment of the invention is approximately 23 mm.

The resilience and the compressive strength of each first resilient support member 59 is such that as the force with which the crop material is being urged against the downstream end 46 of the upstream base part 43 progressively increases above the first predefined value of 200 Newtons, the first resilient support members 59 progressively yield, and in turn the downstream end 46 of the upstream base part 43 is progressively displaced downwardly in the direction of the arrow D from the normal operating state thereof. The downstream end 46 of the upstream base part 43 is illustrated in an intermediate state between the normal operating state and the maximum displaced operating state in FIG. 3. The progressive yielding of the first resilient support members 59 and the progressive displacement of the downstream end 46 of the upstream base part 43 in the direction of the arrow D continues until the force with which the crop material is being urged against the downstream end 46 of the upstream base part 43 by the feed rotor 34 reaches a first upper predefined value of approximately 1,000 Newtons. At which stage the downstream end 46 of the upstream base part 43 is displaced downwardly to the maximum displaced operating state. Thus, the resilience and the compressive strength of the first resilient support members 59 is such that when the load supported by each of the first resilient support members 59 reaches approximately 500 Newtons, the downstream end 46 of the upstream base part 43 has been displaced to the maximum displaced operative state.

Returning now to the resilient pivot mounting 55 of the upstream base part 43, the resilient pivot mounting 55 comprises an elongated transversely extending upper plate member 65 and an elongated transversely extending lower plate member 66. Four transversely spaced apart resilient elements 67 are sandwiched between the upper and lower plate members 65 and 66 and are bonded thereto. Each resilient element 67 is of circular transverse cross-section of diameter 50 mm and height between the upper and lower plate members 65 and 66 of approximately 30 mm. The upper and lower plate members 65 and 66 extend the width of the upstream base part 43. The upstream plate member 65 is secured to the upstream base part 43 adjacent the upstream end 45, while the lower plate member 66 is secured at its respective opposite ends to the framework 12 by respective end mounting brackets 69. The upper and lower plate members 65 and 66 and the resilient elements 67 are configured so that the transversely extending first pivot axis 57 about which the upstream base part 43 is pivotal is defined by the resilient elements 67, and extends substantially centrally and transversely between the upper and lower plate members 65 and 66. In this embodiment of the invention the resilient elements 67 are of a rubber or rubber-like material. The resilient pivot mounting 55 is configured to urge the upstream base part 43 adjacent its downstream end 46 into engagement with the first resilient support members 59 in order to stabilise the upstream base part 43, and to keep it in firm engagement with the first resilient support members 59.

Turning now to the mounting of the downstream base part 44 to the framework 12, the downstream base part 44 is carried on a support structure 70 of a sub-chassis 72 of the framework 12. The sub-chassis 72 and in turn the support structure 70 are pivotally carried on a transversely extending intermediate pivot shaft 73, which defines a transversely extending intermediate pivot axis 74, about which the sub-chassis 72, and in turn the downstream base part 44 are pivoted in the directions of the arrows G and H, see FIGS. 3, 5 and 6, and are downwardly pivotal in the direction of the arrow G, see FIG. 6, for facilitating cleaning and removal of crop material between the downstream base part 44 and the feed rotor 34. A pair of main urging means, namely, a pair of main double-acting hydraulic rams 75 acting between the framework 12 and the sub-chassis 72 on respective opposite sides of the framework 12 pivot the sub-chassis 72 about the intermediate pivot axis 74 in the directions of the arrows G and H, see FIG. 5. The sub-chassis 72 is pivotally coupled to the respective hydraulic rams 75 and define a transversely extending common second pivot axis 76 about which the sub-chassis 72, and in turn the downstream base part 44 is pivotal in the direction of the arrows L and M for a function to be described below.

Returning now to the intermediate pivot shaft 73, the intermediate pivot shaft 73 is pivotally carried in a pair of transversely spaced apart carrier arms 78 which are located to respective opposite sides of the conveying channel 28. The carrier arms 78 are pivotally carried on respective transversely extending carrier pivot shafts 79 which extend sidewardly outwardly from the framework 12 on respective opposite sides thereof at a location upstream from the upstream end 50 of the downstream base part 44 and below the upstream base part 43. The carrier pivot shafts 79 define a common transversely extending carrier pivot axis 80, which is also located upstream of the upstream end 50 of the downstream base part 44 and below the upstream base part 43. The carrier arms 78 are pivotal in the direction of the arrows P and Q about the carrier pivot axis 80, see FIG. 5, for in turn accommodating downward and upward displacement of the intermediate pivot shaft 73 in the directions of the arrows R and S, respectively. The upstream edge 52 defined by the upstream end 50 of the downstream base part 44 terminates on and is secured to the intermediate shaft 73. Accordingly, by facilitating downward and upward displacement of the intermediate pivot shaft 73 in the directions of the arrows R and S, downward and upward displacement of the upstream end 50 of the downstream base part 44 in the direction of the arrows R and S is also facilitated for a purpose to be described below.

Extension members 82 rigidly extend in a downstream direction from the downstream ends of the respective carrier arms 78 downstream of the intermediate pivot shaft 73, and terminate in respective pivotally mounted connecting brackets 83, which are pivotally coupled to the respective extension members 82 about respective pivot shafts 81. The respective connecting brackets 83 are connected to corresponding connecting members 84 which are in turn connected to a second resilient support means provided by respective second resilient support members 85. The second resilient support members 85 are mounted on and supported on respective support brackets 86 located on and secured to respective opposite sides of the framework 12. A central bore 87 extending centrally through each second resilient support member 85 accommodates the corresponding connecting member 84 therethrough to an upper plate member 88 which is supported on an upper end 89 of the corresponding second resilient support member 85.

The second resilient support means, which in this embodiment of the invention is formed by the two second resilient support members 85, resiliently supports the downstream base part 44 adjacent the upstream end 50 thereof in a normal operating state thereof illustrated in FIGS. 2 and 7 defining a downstream portion of the base 30. The second resilient support members 85 support the downstream base part 44 adjacent the upstream end 50 thereof through the carrier arms 78 and in turn through the intermediate shaft 73. The second resilient support members 85, as well as supporting the downstream base part 44 in the normal operating state, are also configured to urge the downstream base part 44 upwardly into the normal operating state, and are preloaded to urge and retain the downstream base part 44 into the normal operating state thereof with a combined urging force of approximately 3,000 Newtons. The connecting brackets 83 define respective abutment surfaces 77, which are engageable with corresponding abutment means formed by the corresponding ones of the support brackets 86, for limiting upward movement of the connecting brackets 83, and for in turn limiting upward movement of the upstream end 50 of the downstream base part 44 in the direction of the arrow S beyond the normal operating state of the downstream base part 44 against the upward urging action of the second resilient support members 85.

The second resilient support members 85 are configured to permit downward displacement of the upstream end 50 of the downstream base part 44 in the direction of the arrow R from the normal operating state thereof in response to the force with which the crop material is being urged against the upstream end 50 of the downstream base part 44 by the feed rotor 34 exceeding a second predefined value, in order to prevent the crop material becoming jammed between the feed rotor 34 and the upstream end 50 of the downstream base part 44. In this embodiment of the invention the second predefined value is equal to the combined force with which the downstream base part 44 is being urged into the normal operating state thereof by the second resilient support members 85, namely, approximately 3,000 Newtons. The second resilient support members 85 are configured to yield to permit downward displacement of the upstream end 50 of the downstream base part 44 in the direction of the arrow R in response to the force, with which the crop material is being urged by the feed rotor 34 against the upstream end 50 of the downstream base part 44, exceeding the second predefined value of 3,000 Newtons. The downward displacement of the upstream end 50 of the downstream base part 44 in the direction of the arrow R in response to the force, with which the crop material is being urged by the feed rotor 34 against the upstream end 50 of the downstream base part 44 exceeding the second predefined value of 3,000 Newtons, is accommodated by the downstream base part 44 pivoting about the second pivot axis 76 in the direction of the arrow L.

The upstream end 50 of the downstream base part 44 is displaceable downwardly in the direction of the arrow R against the upward resilient urging force of the second resilient support members 85 from the normal operating state to a maximum displaced operating state illustrated in FIGS. 4, 8 and 9. The downward displacement of the upstream end 50 of the downstream base part 44 in the direction of the arrow R from the normal operating state to the maximum displaced operating state is between 20 mm and 25 mm, and in this embodiment of the invention is approximately 23 mm. The resilience and the compressive strength of the second resilient support members 85 is such that as the force with which the crop material is being urged by the feed rotor 34 against the upstream end 50 of the downstream base part 44 progressively increases above the second predefined value of 3,000 Newtons, the second resilient support members 85 progressively yield, and in turn the upstream end 50 of the downstream base part 44 is progressively displaced downwardly about the second pivot axis 76 in the direction of the arrow R from the normal operating state thereof. The progressive yielding of the second resilient support members 85 and the progressive downward displacement of the upstream end 50 of the downstream base part 44 continues until the force with which the crop material is being urged against the upstream end 50 of the downstream base part 44 by the feed rotor 34 reaches a second upper predefined value of approximately 6,000 Newtons. At which stage the upstream end 50 of the downstream base part 44 has been displaced downwardly to the maximum displaced operating state thereof.

In this embodiment of the invention each second resilient support member 85 is of a rubber or a rubber-like material, and of cylindrical shape. The diameter of each second resilient support member 85 is approximately 65 mm and the height of each second resilient support member 85 is approximately 80 mm.

While in this embodiment of the invention the second resilient support means has been described as comprising a pair of second resilient support members 85, the second resilient support means may be provided in any other suitable means or form. In some embodiments of the invention it is envisaged that a single second resilient support member may be provided, which would be centrally supported with respect to the width of the conveying channel on the framework 12, and a cross-member extending between the upper plate members 88 or connected directly to the connecting members 84 would be supported on the single second resilient support member. However, it will be readily apparent to those skilled in the art that any number of second resilient support members may be provided to form the second resilient support means.

It has been found that by freely supporting the upstream base part 43 on the first resilient support members 59, and setting the first predefined value of the force with which the crop material is being urged by the feed rotor 34 against the downstream end 46 of the upstream base part 43 at a value of approximately 200 Newtons, at which the first resilient support members 59 yield to permit the downward displacement of the downstream end 46 of the upstream base part 43 about the first pivot axis 57 provides a conveying channel 28 of the conveying device 1 which is suitable for conveying crop material therethrough, irrespective of the density of the sward being picked up from the field, and irrespective of the volume of the sward per unit length of sward being picked up from the field. It has been found that in cases where the sward density is relatively low or the volume of the sward per unit length is relatively low, and thus the depth which the sward takes up on the upstream base part 43 is also relatively low, the upstream base part remains in the normal operating state so that crop material of swards of low density or low volume per unit length is easily gripped by the feed fingers 38 of the feed rotor 34 upstream of the feed rotor 34 in order to avoid a build-up of the crop material on the upstream base part 44, and thus the crop material is readily urged by the feed rotor 34 through the conveying channel 28. Therefore, there are no dead spots on the upstream base part upstream of the feed rotor 34 where a low density sward or a sward of low volume per unit length of crop material is being delivered onto the upstream base part 43 by the pick-up mechanism 18 where the crop material would stop and agglomerate at a location sufficiently upstream on the upstream base part 43, where the crop material could not be gripped by the feed fingers 38 of the feed rotor 34.

Additionally, by virtue of the fact that the upstream base part 43 is pivotally mounted about the first pivot axis 57 adjacent its upstream end 45, and the downstream end 46 thereof terminates beneath the feed rotor 34, the maximum downward displacement of the upstream base part occurs where it is most required, namely, beneath the feed rotor 34, and thus even if the downstream end 46 of the upstream base part 43 were displaced downwardly during conveying of a sward of crop material of low density or low volume per unit length the downward displacement of the upstream base part 43 towards its upstream end 45 would be relatively low, and thus would not affect the ability of the feed rotor 34 to grip such crop material on the upstream side of the feed rotor 34.

On the other hand, when the sward of crop material is of a relatively high density and/or a high volume per unit length, should the bulk of the sward be sufficiently great that the force with which the crop material is urged by the feed rotor 34 against the downstream end 46 of the upstream base part 43 is such that it exceeds the first predefined value of 200 Newtons, the downstream end 46 of the upstream base part 43 is displaced downwardly in the direction of the arrow D with the upstream base part 43 pivoting about the first resilient pivot axis 57. The degree of downward displacement in the direction of the arrow D of the downstream end 46 of the upstream base part 43 is dependent on the force with which the crop material is being urged by the feed rotor 34 against the downstream end 46 of the upstream base part 43 until the force with which the crop material is being urged by the feed rotor 34 against the downstream end 46 of the upstream base part 43 reaches the first upper predefined value of 1,000 Newtons. At which stage the downstream end 46 of the upstream base part 43 has been urged downwardly to the maximum displaced operating state. In general, the crop material would not be urged by the feed rotor 34 against the downstream end 46 of the upstream base part 43 with a force anywhere near 1,000 Newtons, unless the crop material had actually jammed between the feed rotor 34 and the upstream base part 43.

Accordingly, as well as the conveying device according to the invention being suitable for conveying crop material through the conveying channel, irrespective of the density or volume per unit length of the sward of the crop material, in view of the fact that the downstream end 46 of the upstream base part 43 is displaceable downwardly through approximately 23 mm to the maximum displaced operating state in response to the force with which the crop material is being urged by the feed rotor 34 against the downstream end 46 of the upstream base part 43, in general, the crop material passes freely through the conveying channel without resulting in jamming of the crop material between the feed rotor 34 and the upstream base part 43. This, thus, minimises the number of jams of crop material between the feed rotor and the base of the conveying channel, which would otherwise result in the automatic torque limiting cut-out clutch activating to disengage the feed rotor 34 from the drive transmission of the conveying device.

It has been found that once the crop material is conveyed over the upstream base part 43 without dead spots occurring, in general, the crop material once it has been gripped by the feed fingers 38 of the feed rotor 34 continues to be urged by the feed rotor 34 over the downstream base part 44, and in particular, over the upstream end 50 of the downstream base part 44. However, in the event of a high density sward, a sward of excessively high density or of excessively high volume per unit length being encountered, should the force with which the crop material is being urged by the feed rotor 34 against the upstream end 50 of the downstream base part 44 exceeding the second predefined value of approximately 3,000 Newtons, the second resilient support members 85 commence to yield, thereby permitting downward displacement in the direction of the arrow R of the upstream end 50 of the downstream base part 44 to allow passage of the crop material between the feed rotor 34 and the downstream base part 44.

In this embodiment of the invention the upstream and downstream base parts 43 and 44 are located to form the base 30 of the conveying channel 28, so that a transverse plane extending perpendicularly from the base 30 adjacent the downstream end 46 of the upstream base part 43 and the upstream end 50 of the downstream base part 44 contains the transversely extending rotational axis 36 of the feed rotor 34, or the transversely extending rotational axis 36 of the feed rotor 34 is located adjacent the transverse plane extending substantially perpendicularly from the base 30 adjacent the downstream and upstream ends 46 and 50 of the upstream and downstream base parts 43 and 44, respectively.

In this embodiment of the invention the upstream base part 43 and the downstream base part 44 extend the width of the conveying channel 28. Side platforms 90 on respective opposite sides of the upstream base part 43 extend from the stripper plate 25 along the respective opposite side edges 49 of the upstream base part 43. A pair of transversely extending side augers 91 located on the side platforms 90 are rotatably mounted in the framework 12 about the pivot axis 20, and are driven by the transmission system (not shown) of the conveying device 1 for urging any crop material on the side platforms 90 onto the upstream base part 43 and in turn into the conveying channel 28.

In use, as the baler 4 with the conveying device 1 forwardly coupled thereto is towed by a tractor or other prime mover through a field, the pick-up mechanism 18 picks up the crop material from an elongated sward lying on the field. The sward of crop material is delivered by the pick-up mechanism 18 onto the upstream base part 43, and is in turn urged through the conveying channel 28 by the feed rotor 34. The feed rotor 34 as well as urging the crop material through the conveying channel 28, also cooperates with the knives 40 which chop the crop material into short length as the crop material is being urged through the conveying channel 28. The chopped crop material is then delivered from the downstream end 51 of the downstream base part 44 through the inlet opening 2 into the bale forming chamber 3 of the baler 4. Any crop material delivered by the pick-up mechanism 18 onto the side platforms 90 is urged by the side augers 91 onto the upstream base part 43.

For so long as the sward of crop material being picked up by the pick-up mechanism 18 is of relatively low density or of relatively low volume per unit length, the upstream base part 43 remains in the normal operating state freely supported on the first resilient support members 59, and the sward is relatively easily gripped by the gripping fingers 38 of the feed rotor 34 and urged through the conveying channel 28 to the baler 4. In the event of the density of the sward crop material increasing or the volume per unit length of the sward increasing, should the force with which the crop material is urged by the feed rotor 34 against the downstream end 46 of the upstream base part 43 exceed the first predefined value of 200 Newtons, the first resilient support members 59 commence to yield and the downstream end 46 of the upstream base part 43 is displaced downwardly in the direction of the arrow D against the upward urging action of the first resilient support members 59. The degree of downward displacement of the downstream end 46 of the upstream base part 43 depends on the force with which the crop material is being urged by the feed rotor 34 against the downstream end 46 of the upstream base part 43. Thus, allowing the crop material to pass between the feed rotor 34 and the upstream base part 43. In the event that a sward of crop material of excessive density or of excessive volume per unit length is encountered, and the force with which the crop material is being urged by the feed rotor 34 against the upstream end 50 of the downstream base part 44 exceeds the second predefined value of 3,000 Newtons, the second resilient support members 85 commence to yield, thus permitting downward displacement of the upstream end 50 of the downstream base part 44 which in turn allows the crop material to pass between the feed rotor 34 and the downstream base part 44, thereby avoiding or at least minimising jamming of the crop material between the feed rotor 34 and either the downstream base part 44 or the upstream base part 43.

While the upstream base part has been described as being pivotal about a transversely extending first pivot axis which is defined by a resilient pivot mounting element, it will be readily apparent to those skilled in the art that the upstream base part may be pivotal adjacent the upstream end thereof by any suitable pivot means, for example, by a conventional pivot shaft or any other suitable pivot means. It will also be appreciated that while the downstream base part has been described as being pivotal about a second pivot axis defined by the pivotal connections of the main rams 75 to the sub-chassis on which the downstream base part is carried, any other suitable pivot means for pivotally coupling the downstream base part adjacent or towards the downstream end may be provided.

It will also be appreciated that while the intermediate shaft has been described as being carried on a pair of pivotally mounted carrier arms and the carrier arms are supported on the second resilient support members, while this is advantageous, it is not essential, and in certain embodiments of the invention the intermediate pivot shaft, or indeed the upstream end of the downstream base part could be supported directly on the second resilient support means. Indeed, in certain cases, it is envisaged that the carrier arms, or the intermediate pivot shaft, or the downstream base part could be freely supported on a suitable resilient support means which would be located beneath either the carrier arms, the intermediate pivot shaft or the upstream end of the downstream base part. It is also envisaged that the downstream base part could be supported by a suitable second resilient support means which would act between the upstream end of the downstream base part and the sub-chassis or the support structure of the sub-chassis. In which case, the upstream end of the downstream base part would be displaced downwardly by the force with which the crop material is urged against the upstream end of the downstream base part by the feed rotor exceeding the second predefined value relative to the sub-chassis and the intermediate pivot shaft.

It will also of course be appreciated that while it is desirable, it is not essential that the downstream base part should be pivotal about the intermediate pivot shaft for facilitating clearing of crop material or jammed crop material from the conveying channel.

While the conveying device has been described with a particular type of pick-up mechanism, any other suitable pick-up mechanism may be provided. It will also be appreciated that in certain cases, the conveying device may be provided without ground engaging wheels.

It will also be appreciated that while specific first and second resilient mounting means have been described, any other suitable first and second resilient mounting means may be provided. For example, instead of the first resilient support means being provided by rubber or rubber-like resilient support members, the first resilient support means may be provided by one or more springs such as one or more compression springs, or one or more tension springs, or indeed a combination of compression and tension springs. Needless to say, the second resilient support means could also be provided by springs.

While the conveying device has been described as comprising a particular type of feed rotor, it will be readily apparent to those skilled in the art that any other suitable feed rotor may be provided. It is also envisaged that the conveying channel may be provided with our without knives which cooperate with the feed fingers of the feed rotor, and in certain cases, the knives may be mounted to be selectively urgeable into and out of the conveying channel.

It is also envisaged that while the conveying device has been described for conveying crop material to a round baler, the conveying device may be provided for conveying crop material, or indeed, any other material to any other type of machine, agricultural or other machine, be it a baler, a round baler, a square baler or any other type of crop or other material processing, baling or packing machine. It will also be appreciated that the conveying device may be used for conveying any other type of material besides crop material for baling in a baler, be it a round baler or a square baler.

While the conveying device according to the invention has been described whereby the conveying channel extends below the feed rotor, it is envisaged that the conveying device according to the invention may be provided whereby the conveying channel would extend over the feed rotor, and in which case, the base of the conveying channel would be inverted with the base thereof being the highest part of the conveying channel.

It is also envisaged that while the conveying device has been described as comprising both an upstream base part and a downstream base part, both of which are displaceable downwardly adjacent their downstream end and upstream end, respectively, it is envisaged that in certain cases, only the upstream base part would be configured to be displaceable, such that the downstream end of the upstream base part would be downwardly displaceable, and in which case it is envisaged that the downstream end of the upstream base part would terminate beneath the feed rotor. The downstream base part would not be configured to be displaceable downwardly adjacent its upstream end.

While the displacement of the downstream end of the upstream base part and the upstream end of the downstream base part from their respective normal operating states to their respective maximum displaced operating states has been described as being approximately 23 mm, this displacement will largely depend on the type, size and power of the conveying device, and additionally, on the type and size of conveying channel and the type, size and power of feed rotor. However, in general, it is envisaged that the displacement of the downstream end of the upstream base part and the upstream end of the downstream base part between the normal operating states and the maximum displaced operating states of the upstream and downstream base parts, respectively, may range up to 50 mm for larger more powerful conveying devices, although in general, it is envisaged that the maximum displacement would not exceed 30 mm, and generally, would be between 20 mm and 25 mm.

It is also envisaged that the first and second predefined values and the first and second upper predefined values of the force, with which the feed rotor urges the crop material against the downstream end of the upstream base part and the upstream end of the downstream base part, and at which the first and second resilient support means yield, and at which the first and second resilient support means allow the upstream base part and the downstream base part to reach their respective maximum displaced operating states will largely be dependent on the size, power and type of the conveying device, and in particular, the size, power and type of the feed rotor. However, in general, it is envisaged that the first predefined value in general will lie in the range of 100 Newtons and 400 Newtons, and the first upper predefined value will lie in the range of 500 Newtons to 1,200 Newtons. It is also envisaged that the second predefined value will lie within the range of 2,000 Newtons to 4,000 Newtons, while the second upper predefined value will lie within the range of 4,000 Newton to 8,000 Newtons.

The invention claimed is:

1. A conveying device comprising:
    a longitudinally extending conveying channel extending between an upstream end and a downstream end,
    the conveying channel having
        a base extending longitudinally between the upstream end and the downstream end of the conveying channel,
        a feed rotor located in the conveying channel and rotatable about a transversely extending rotational axis for urging material through the conveying channel,
    wherein
    the base of the conveying channel comprises
        an upstream base part extending between an upstream end and a downstream end thereof, and
        a downstream base part extending between an upstream end and a downstream end thereof,
    the upstream base part and the downstream base part being arranged sequentially in the conveying channel with the downstream end of the upstream base part terminating adjacent the upstream end of the downstream base part,
    the downstream end of the upstream base part being resiliently supported by a first resilient support means in a normal operating state thereof to define an upstream portion of the base of the conveying channel, and being urgeable downwardly against the first resilient support means from the normal operating state thereof away from the conveying channel in response to the force with which the material is being urged against the downstream end of the upstream base part by the feed rotor exceeding a first predefined value, and
    the upstream end of the downstream base part being resiliently supported by a second resilient support means in a normal operating state thereof to define a downstream portion of the base of the conveying channel, and being urgeable downwardly against the second resilient support means from the normal operating state thereof away from the conveying channel in response to the force with which the material is being urged against the upstream end of the downstream base part by the feed rotor exceeding a second predefined value.

2. A conveying device as claimed in claim 1 in which the downstream end of the upstream base part is freely supported on the first resilient support means in the normal operating state thereof.

3. A conveying device as claimed in claim 1 in which the first resilient support means is configured to permit displacement of the downstream end of the upstream base part between the normal operating state thereof and a maximum displaced operating state thereof.

4. A conveying device as claimed in claim 1 in which the upstream base part is pivotally mounted adjacent the upstream end thereof about a substantially transversely extending first pivot axis by a resilient pivot mounting means, the resilient pivot mounting means comprising at least one resilient mounting element defining the first pivot axis extending therethrough.

5. A conveying device as claimed in claim 1 in which the second resilient support means is compressively resilient.

6. A conveying device as claimed in claim 1 in which the upstream end of the downstream base part is supported on the second resilient support means through at least one carrier arm, the carrier arm being pivotally mounted about a transversely extending carrier arm pivot axis spaced apart from the upstream end of the downstream base part.

7. A conveying device as claimed in claim 6 in which the upstream end of the downstream base part is pivotally coupled to the at least one carrier arm about a transversely extending intermediate pivot axis.

8. A conveying device as claimed in claim 7 in which the second resilient support means is configured to permit displacement of the upstream end of the downstream base part between the normal operating state thereof and a maximum displaced operating state thereof.

9. A conveying device as claimed in claim 1 in which the first and second resilient support means are independent of each other, and the first and second predefined values are different.

10. A conveying device as claimed in claim 1 in which the upstream end of the downstream base part is located beneath the feed rotor.

11. A conveying device as claimed in claim 1 in which a pick-up means is located adjacent the upstream end of the conveying channel, the upstream end of the conveying channel being configured for receiving the material from the pick-up means.

12. A baler comprising a round baler configured for producing a cylindrical bale of material, and the conveying device as claimed in claim 1, the conveying channel of the conveying device being configured for feeding the material to the round baler.

13. A conveying device as claimed in claim 1 in which the first resilient support means is compressively resilient.

14. A conveying device as claimed in claim 1 in which the first resilient support means comprises a rubber or a rubber-like material.

15. A conveying device as claimed in claim 1 in which the upstream end of the upstream base part terminates adjacent the upstream end of the channel.

16. A conveying device as claimed in claim 6 in which the carrier arm pivot axis is spaced apart from the upstream end of the downstream base part in an upstream direction from the upstream end of the downstream base part.

17. A conveying device as claimed in claim 6 in which the carrier arm pivot axis is disposed below the upstream base part.

18. A conveying device as claimed in claim 6 in which the at least one carrier arm is coupled to the second resilient support means at a location generally downstream of the upstream end of the downstream base part.

19. A method for conveying material through a conveying channel, the conveying channel having a base extending between an upstream end and a downstream end, and a feed rotor located in the conveying channel and rotatable about a transversely extending rotational axis for urging the material through the conveying channel, the method comprising:
   configuring the base with an upstream base part extending between an upstream end and a downstream end thereof, and a downstream base part extending between an upstream end and a downstream end thereof,
   sequentially arranging the upstream and downstream base parts with the downstream end of the upstream base part terminating adjacent the upstream end of the downstream base part,
   supporting the downstream end of the upstream base part on a first resilient support means in a normal operating state thereof to define an upstream portion of the base of the conveying channel,
   supporting the upstream end of the downstream base part on a second resilient support means in a normal operating state thereof to define a downstream portion of the base of the conveying channel,
   permitting the downstream end of the upstream base part to be urged against the first resilient support means from the normal operating state thereof away from the conveying channel in response to the force with which the material is being urged against the downstream end of the upstream base part by the feed rotor exceeding a first predefined value, and
   permitting the upstream end of the downstream base part to be urged against the second resilient support means from the normal operating state thereof away from the conveying channel in response to the force with which the material is being urged against the upstream end of the downstream base part by the feed rotor exceeding a second predefined value.

20. A method for conveying material through a conveying channel, the conveying channel having a base extending between an upstream end and a downstream end, and a feed rotor located in the conveying channel and rotatable about a transversely extending rotational axis for urging the material through the conveying channel, the method comprising:
   configuring the base with an upstream base part extending between an upstream end and a downstream end thereof,
   supporting the downstream end of the upstream base part on a first resilient support means in a normal operating state thereof to define an upstream portion of the base of the conveying channel,
   permitting the downstream end of the upstream base part to be urged against the first resilient support means from the normal operating state thereof away from the conveying channel in response to the force with which the material is being urged against the downstream end of the upstream base part by the feed rotor exceeding a first predefined value.

\* \* \* \* \*